(12) United States Patent
Sekiya

(10) Patent No.: US 7,305,358 B1
(45) Date of Patent: Dec. 4, 2007

(54) COMPUTING METHOD FOR ACCOUNTING

(76) Inventor: Akio Sekiya, 1-9-3, Houmen-nishi, Matsuyama-shi, Ehime-ken 790-0043 (JP)

( * ) Notice: Subject to any disclaimer, the term of this patent is extended or adjusted under 35 U.S.C. 154(b) by 0 days.

(21) Appl. No.: 09/453,568

(22) Filed: Dec. 2, 1999

(51) Int. Cl.
G07B 17/00 (2006.01)

(52) U.S. Cl. .......................................... 705/30; 705/34

(58) Field of Classification Search .................. 705/30
See application file for complete search history.

(56) References Cited

U.S. PATENT DOCUMENTS

| | | | | |
|---|---|---|---|---|
| 5,361,393 | A | * | 11/1994 | Rossillo ......................... 713/1 |
| 5,749,078 | A | * | 5/1998 | Gargiulo et al. ............... 705/30 |
| 5,875,435 | A | * | 2/1999 | Brown ......................... 705/30 |
| 6,085,264 | A | * | 7/2000 | Katoh ......................... 710/59 |
| 6,092,055 | A | * | 7/2000 | Owens et al. .................. 705/34 |
| 6,134,563 | A | * | 10/2000 | Clancey et al. ............. 707/503 |
| 6,275,813 | B1 | * | 8/2001 | Berka ........................... 705/30 |
| 6,292,811 | B1 | * | 9/2001 | Clancey et al. ............. 707/503 |

FOREIGN PATENT DOCUMENTS

JP 409277745 A * 10/1997
JP 02000181975 A * 6/2000

OTHER PUBLICATIONS

TurboTax 1997; 1997; Intuit Inc.; p. 1-66.*

* cited by examiner

*Primary Examiner*—Elaine Gort
(74) *Attorney, Agent, or Firm*—Rabin & Berdo, PC

(57) ABSTRACT

The present invention provides a computing method for accounting, comprising: (a) the first step of installing and storing spreadsheet software capable of creating accounting screens each of which is a matrix of cells including input setting cells and output displaying cells; (b) the second step of storing functional formulas and/or operational expressions for use in determining, based on numerical values entered in the input setting cells, numerical values to be displayed in the output displaying cells; (C) the third step of calling the accounting screens of at least N different kinds to develop and arrange the same on the display; (d) the fourth step of entering a given numerical value in a predetermined input setting cell; and (e) the fifth step of performing predetermined computations, based on the entered, given numerical value, according to the functional formulas and/or operational expressions to display numerical values indicative of the computation results in predetermined output displaying cells so as to complete each of the accounting screens.

16 Claims, 17 Drawing Sheets

| | AL | AM | AN | AO | AP | AQ | AR | AS | AT | AU | AV | AW | AX |
|---|---|---|---|---|---|---|---|---|---|---|---|---|---|
| 1 | | | | | | | | | | | | | |
| 2 | | | ○ | | | | (3) | | | merchandise management | | | |
| 3 | | carryover | | | | purchase | | sales | | balance(merchandise profit) | | inventory on book | |
| 4 | | quantity | amount | | ❺ | quantity | amount | quantity | amount | quantity | amount | @ | amount |
| 5 | | . . . . | | consumption tax | 0 | . . . . | | . . . . | | . . . . | | . . | . . . . |
| 6 | | | | | 1 | (1) | (2) | (3) | (4) | (5) | (6) | | (7) |
| 7 | | | | | 2 | | | | | | | | |
| 8 | | | | | 3 | | | | | | | | |
| ... | | | | | ... | | | | | | | | |
| 87 | | | | | | | | | | | | | |
| 88 | | (8) | (9) | | total | (10) | (11) | (12) | (13) | (14) | (15) | | (16) |

Fig. 4

| BA | BB | BC | BE | BF | BH | BI | BK | BL | BN | BO | BQ | BR |
|---|---|---|---|---|---|---|---|---|---|---|---|---|
| 1 | | | | | | | | | | | | |
| 2 | | | | (4) | : customer management | | | | | | | |
| 3 | | supplier | | distributor | | distributor | | distributor | | distributor | | distributor |
| 4 | 1 | (1) | 1 | (2) | 85 | | 169 | | 253 | | 337 | |
| 5 | 2 | | 2 | | 86 | | 170 | | 254 | | 338 | |
| 6 | 3 | | 3 | | 87 | | 171 | | 255 | | 339 | |
| 7 | 4 | | 4 | | 88 | | 172 | | 256 | | 340 | |
| 8 | 5 | | 5 | | 89 | | 173 | | 257 | | 341 | |
| 9 | 6 | | 6 | | 90 | | 174 | | 258 | | 342 | |
| 10 | 7 | | 7 | | 91 | | 175 | | 259 | | 343 | |
| 11 | 8 | | 8 | | 92 | | 176 | | 260 | | 344 | |
| 12 | 9 | | 9 | | 93 | | 177 | | 261 | | 345 | |
| 13 | 10 | | 10 | | 94 | | 178 | | 262 | | 346 | |
| 14 | 11 | | 11 | | 95 | | 179 | | 263 | | 347 | |
| 15 | 12 | | 12 | | 96 | | 180 | | 264 | | 348 | |
| 16 | 13 | | 13 | | 97 | | 181 | | 265 | | 349 | |
| 17 | 14 | | 14 | | 98 | | 182 | | 266 | | 350 | |
| 18 | 15 | | 15 | | 99 | | 183 | | 267 | | 351 | |
| 19 | 16 | | 16 | | 100 | | 184 | | 268 | | 352 | |
| 20 | 17 | | 17 | | 101 | | 185 | | 269 | | 353 | |
| 21 | 18 | | 18 | | 102 | | 186 | | 270 | | 354 | |
| 22 | 19 | | 19 | | 103 | | 187 | | 271 | | 355 | |
| 23 | 20 | | 20 | | 104 | | 188 | | 272 | | 356 | |
| 24 | 21 | | 21 | | 105 | | 189 | | 273 | | 357 | |
| 25 | 22 | | 22 | | 106 | | 190 | | 274 | | 358 | |
| 26 | 23 | | 23 | | 107 | | 191 | | 275 | | 359 | |
| 27 | 24 | | 24 | | 108 | | 192 | | 276 | | 360 | |
| 28 | 25 | | 25 | | 109 | | 193 | | 277 | | 361 | |
| 29 | 26 | | 26 | | 110 | | 194 | | 278 | | 362 | |
| 30 | 27 | | 27 | | 111 | | 195 | | 279 | | 363 | |
| 31 | 28 | | 28 | | 112 | | 196 | | 280 | | 364 | |
| 32 | 29 | | 29 | | 113 | | 197 | | 281 | | 365 | |
| 33 | 30 | | 30 | | 114 | | 198 | | 282 | | 366 | |
| 34 | 31 | | 31 | | 115 | | 199 | | 283 | | 367 | |
| 35 | 32 | | 32 | | 116 | | 200 | | 284 | | 368 | |
| 36 | 33 | | 33 | | 117 | | 201 | | 285 | | 369 | |
| 37 | 34 | | 34 | | 118 | | 202 | | 286 | | 370 | |
| 38 | 35 | | 35 | | 119 | | 203 | | 287 | | 371 | |
| 39 | 36 | | 36 | | 120 | | 204 | | 288 | | 372 | |
| 40 | 37 | | 37 | | 121 | | 205 | | 289 | | 373 | |
| 41 | 38 | | 38 | | 122 | | 206 | | 290 | | 374 | |
| 42 | 39 | | 39 | | 123 | | 207 | | 291 | | 375 | |
| 43 | 40 | | 40 | | 124 | | 208 | | 292 | | 376 | |
| 44 | 41 | | 41 | | 125 | | 209 | | 293 | | 377 | |
| 45 | 42 | | 42 | | 126 | | 210 | | 294 | | 378 | |
| 46 | 43 | | 43 | | 127 | | 211 | | 295 | | 379 | |
| 47 | 44 | | 44 | | 128 | | 212 | | 296 | | 380 | |
| 48 | 45 | | 45 | | 129 | | 213 | | 297 | | 381 | |
| 49 | 46 | | 46 | | 130 | | 214 | | 298 | | 382 | |
| 50 | 47 | | 47 | | 131 | | 215 | | 299 | | 383 | |
| 51 | 48 | | 48 | | 132 | | 216 | | 300 | | 384 | |
| 52 | 49 | | 49 | | 133 | | 217 | | 301 | | 385 | |
| 53 | 50 | | 50 | | 134 | | 218 | | 302 | | 386 | |
| 54 | 51 | | 51 | | 135 | | 219 | | 303 | | 387 | |
| 55 | 52 | | 52 | | 136 | | 220 | | 304 | | 388 | |
| 56 | 53 | | 53 | | 137 | | 221 | | 305 | | 389 | |
| 57 | 54 | | 54 | | 138 | | 222 | | 306 | | 390 | |
| 58 | 55 | | 55 | | 139 | | 223 | | 307 | | 391 | |
| 59 | 56 | | 56 | | 140 | | 224 | | 308 | | 392 | |
| 60 | 57 | | 57 | | 141 | | 225 | | 309 | | 393 | |
| 61 | 58 | | 58 | | 142 | | 226 | | 310 | | 394 | |
| 62 | 59 | | 59 | | 143 | | 227 | | 311 | | 395 | |
| 63 | 60 | | 60 | | 144 | | 228 | | 312 | | 396 | |
| 64 | 61 | | 61 | | 145 | | 229 | | 313 | | 397 | |
| 65 | 62 | | 62 | | 146 | | 230 | | 314 | | 398 | |
| 66 | 63 | | 63 | | 147 | | 231 | | 315 | | 399 | |
| 67 | 64 | | 64 | | 148 | | 232 | | 316 | | 400 | |
| 68 | 65 | | 65 | | 149 | | 233 | | 317 | | 401 | |
| 69 | 66 | | 66 | | 150 | | 234 | | 318 | | 402 | |
| 70 | 67 | | 67 | | 151 | | 235 | | 319 | | 403 | |
| 71 | 68 | | 68 | | 152 | | 236 | | 320 | | 404 | |
| 72 | 69 | | 69 | | 153 | | 237 | | 321 | | 405 | |
| 73 | 70 | | 70 | | 154 | | 238 | | 322 | | 406 | |
| 74 | 71 | | 71 | | 155 | | 239 | | 323 | | 407 | |
| 75 | 72 | | 72 | | 156 | | 240 | | 324 | | 408 | |
| 76 | 73 | | 73 | | 157 | | 241 | | 325 | | 409 | |
| 77 | 74 | | 74 | | 158 | | 242 | | 326 | | 410 | |
| 78 | 75 | | 75 | | 159 | | 243 | | 327 | | 411 | |
| 79 | 76 | | 76 | | 160 | | 244 | | 328 | | 412 | |
| 80 | 77 | | 77 | | 161 | | 245 | | 329 | | 413 | |
| 81 | 78 | | 78 | | 162 | | 246 | | 330 | | 414 | |
| 82 | 79 | | 79 | | 163 | | 247 | | 331 | | 415 | |
| 83 | 80 | | 80 | | 164 | | 248 | | 332 | | 416 | |
| 84 | 81 | | 81 | | 165 | | 249 | | 333 | | 417 | |
| 85 | 82 | | 82 | | 166 | | 250 | | 334 | | 418 | |
| 86 | 83 | | 83 | | 167 | | 251 | | 335 | | subtotal | (8) |
| 87 | 84 | | 84 | | 168 | | 252 | | 336 | | total | (9) |
| 88 | total | (3) | subtotal | (4) | subtotal | (5) | subtotal | (6) | subtotal | (7) | | |

Fig. 5

| | BT | BW | BZ | CA | | CJ | CL | CN | CP |
|---|---|---|---|---|---|---|---|---|---|
| | balance management | | expense management | | ⑤ | | bill management | | |
| | | | | | | ★ | | ★ | |
| | | | | | | bill payable | issued | bill receivable | accepted |
| | account receivable | | 1 | interest | 21 | | | | |
| | | | | transportation cost | 22 | | | | |
| | account payable | | 2 | | | | | | |
| | debt | | 3 | newspaper | 23 | | | | |
| | loan | | 4 | stationery | 24 | | | | |
| | owner's credit | | 5 | communication | 25 | | | | |
| | deposit money | | 6 | telephone bill | 26 | | | | |
| | bill receivable | | 7 | insurance | 27 | | | | |
| | bill payable | | 8 | tax | 28 | | | | |
| | advance | | 9 | salary | 29 | | | | |
| | capital subscription | | 10 | welfare | 30 | | | | |
| | | | 11 | business trip | 31 | | | | |
| | | | 12 | entertainment expense | 32 | | | | |
| | | | 13 | car | 33 | | | | |
| | | | 14 | oil | 34 | | | | |
| | | | 15 | sundry | 35 | | | | |
| | | | 16 | bad debt | 36 | | | | |
| | | | 17 | discount | 37 | | | | |
| | | | 18 | | 38 | | | | |
| | balance item reserved 11~18 | | | | 39 | | | | |
| | expense item reserved 38~43 | | | | 40 | | | | |
| | | | | | 41 | | | | |
| | | | | | 42 | | | | |
| | | | | | 43 | | | | |
| | total balance | | 51 | total expense | 53 | | 61 | | 62 |
| | last-term balance | | 52 | today's balance | 54 | | | | |
| | | | | | 100 | A+B+C+D | | | |
| | | | | data | | | | | |

| | | last term-end | | term-end of this month | |
|---|---|---|---|---|---|
| | bank | ○ | | 101 | A |
| | post office | ○ | | 102 | B |
| | cash | ○ | | 103 | C |
| | checking | ○ | | 104 | D |
| | account receivable | ○ | | 105 | |
| | account payable | ○ | | 106 | |
| | sales | | | 107 | |
| | purchase | | | 108 | |
| | inventory | ○ | | 109 | |
| | expense | | | 110 | |
| | capital | ○ | | 111 | |
| | owner's credit | | | 112 | |
| | debt | ○ | | 113 | |
| | loan | ○ | | 114 | |
| | advance | ○ | | 115 | |
| | bill receivable | ○ | | 116 | |
| | bill payable | ○ | | 117 | |
| | capital asset | ○ | | 118 | |
| | capital subscription | ○ | | 119 | |
| | investment | ○ | | 120 | |
| | deposit | ○ | | 121 | |
| | allowance | ○ | | 122 | |
| | bill receivable accepted | | | 123 | |
| | bill payable issued | | | 124 | | notice input numeral here according to No. 8 at the time of merging (be sure to delete at the beginning of)

Fig. 6

| | CR | CT | CV | CW | CX | CZ | DB | DD |
|---|---|---|---|---|---|---|---|---|
| 2 | | | | | | | | |
| 3 | | ⑥ | trial balance | | | profit and loss statement | | |
| 4 | | | | | | | | |
| 5 | CA58 | bank | | | | | sales | CX12 |
| 6 | CA59 | postal transfer | | | CX13 | | purchase | |
| 7 | CA60 | cash | | | CX14 | | initial | |
| 8 | CA61 | checking | | | | | inventory | CA67 |
| 9 | CA63 | account receivable | | | | | | |
| 10 | | account payable | | CA64 | CX56 | | expense | |
| 11 | | | | | | | | |
| 12 | | | sales | CA65 | CX81 | carryover | allowance | refund CX79 |
| 13 | | | purchase | CA66 | CX83 | | depreciation | |
| 14 | | | initial | BW67 | | | | |
| 15 | | merchandise profit | | CX12-CX13-CX14 | | | profit and loss | CZ15-DD5-DD8-DD12 |
| 16 | CA69 | expense | | | @SUM(CZ5..CZ15) | | total | @SUM(DD5..DD15) |
| 17 | | | | | | | | |
| 18 | | capital | | CA71 | | | | |
| 19 | CA72 | owner's credit | | | | | balance sheet | |
| 20 | | debt | | CA73 | | | | |
| 21 | CA74 | loan | | | | | | |
| 22 | | advance | | CA75 | CR5 | | bank | |
| 23 | CA76 | bill receivable | | | CR5 | | postal transfer | |
| 24 | | bill payable | | CA77 | CR7 | | cash | |
| 25 | CA78 | capital asset | | | CR8 | | checking | |
| 26 | CA79 | capital subscription | | | | | | |
| 27 | CA80 | investment | | | CX62 | | account receivable | |
| 28 | | deposit money | | CA81 | | | account payable | CX58 |
| 29 | | allowance | | BW82 | | | | |
| 30 | | | | | DD8 | | inventory | |
| 31 | | | | | | | capital | CX85 |
| 32 | @SUM(CR5..CR31) | total | | @SUM(CW5..CW31) | CX68 | | owner's credit | |
| 33 | | | | | | | debt | CX70 |
| 34 | | | | | CX72 | | loan | |
| 35 | | work sheet | | | | | advance | CW22 |
| 36 | | | | | CR23 | | bill receivable | |
| 37 | interest | -CA5 | | CT38+CW37 | | | bill payable | CW24 |
| 38 | transportation cost | -CA7 | | CT38+CW38 | CX75 | | capital asset | |
| 39 | newspaper | -CA9 | | CT39+CW39 | CR26 | | capital subscription | |
| 40 | stationary | -CA11 | | CT40+CW40 | CR27 | | investment | |
| 41 | communication | -CA13 | | CT41+CW41 | | | deposit money | CX77 |
| 42 | telephone bill | -CA15 | | CT42+CW42 | | | allowance | BW82 |
| 43 | insurance | -CA17 | | CT43+CW43 | DD12 | refund | allowance | carryover CZ12 |
| 44 | tax | -CA19 | | CT44+CW44 | | | | |
| 45 | salary | -CA21 | | CT45+CW45 | | | | |
| 46 | welfare | -CA23 | | CT46+CW46 | | | | |
| 47 | business trip | -CA25 | | CT47+CW47 | DD15 | | profit and loss | |
| 48 | entertainment expense | -CA27 | | CT48+CW48 | | | | |
| 49 | car | -CA29 | | CT49+CW49 | @SUM(CZ22..CZ48) | | total | @SUM(DD22..DD48) |
| 50 | oil | -CA31 | | CT50+CW50 | | | | |
| 51 | sundry | -CA33 | | CT51+CW51 | | | profit and loss disposition | |
| 52 | bad debt | -CA35 | | CT52+CW52 | | | | |
| 53 | discount | -CA37 | | CT53+CW53 | | | capital | DD31 |
| 54 | | | | +CW54+CW55 | CZ32 | | owner's credit | |
| 55 | | | | | | | deposit money | DD41 |
| 56 | total | @SUM(CV37..CV55) | | @SUM(CZ37..CZ55) | CZ47 | | profit and loss | |
| 57 | | | | | | | | |
| 58 | account payable | CA64 | | CT58+CW58 | | | next term capital | DD55-CZ59-CZ56-DD57 |
| 59 | | | | +CW59+CW60 | | | | |
| 60 | | | | | | | | |
| 61 | | | | | | | | |
| 62 | account receivable | CA63 | | CT62+CW62 | | | | |
| 63 | | | | +CW63+CW64 | | | | |
| 64 | | | | | | | | |
| 65 | | | | | | | | |
| 66 | | | | | | | | |
| 67 | | | | | | | | |
| 68 | owner's credit | CA72 | | CT68+CW68 | | | | |
| 69 | | | | | | | | |
| 70 | debt | CA73 | | CT70+CW70+CW71 | | | | |
| 71 | | | | | | | | |
| 72 | loan | CA74 | | CT72+CW72+CW73 | | | | |
| 73 | | | | | | | | |
| 74 | | | | | | | | |
| 75 | capital asset | CA78 | | CT75-CW75 | | | | |
| 76 | | | | | | | | |
| 77 | deposit money | CW28 | | CT77+CW77 | | | | |
| 78 | | | | | | | | |
| 79 | allowance/last term | CA82 | | CW79 | | | | |
| 80 | | | | | | | | |
| 81 | allowance/this term | | | CW81 | | | | |
| 82 | | | | | | | | |
| 83 | depreciation | | | CW83 | | | | |
| 84 | | | | | | | | |
| 85 | capital | CA71 | | CT85+CW85 | | | | |
| 86 | | | | +CW86+CW87 | | | | |
| 87 | | | | | | | | |
| 88 | | | | | | | | |

Fig. 7

⑦ income tax return on blue form (taxation office: form)

profit and loss statement

| | title | | settled amount | | title | | settled amount | | title | | settled amount |
|---|---|---|---|---|---|---|---|---|---|---|---|
| | sales amount | 1 | DD5 | | depreciation | 18 | CZ13 | | allowance for bad debt | 35 | DD12 |
| | | | | | employee benefits and welfare | 19 | CT46 | carry-back | | 36 | |
| sale cost | initial inventory | 2 | CZ7 | | salary and wage | 20 | CT45 | | | 37 | |
| | purchase | 3 | CZ6 | | interest discount | 21 | CX37 | | | 38 | |
| | total | 4 | DJ11+DJ12 | | land and house rents | 22 | | | total | 39 | DR9 |
| | closing inventory | 5 | DD8 | expense | bad debt | 23 | CX52 | | wage of family employee | 40 | |
| | deducted cost | 6 | DJ13+DJ14 | | discount | 24 | CX53 | | allowance for bad debt | 41 | CZ12 |
| | balance | 7 | DJ9+DJ15 | | | 25 | | | | 42 | |
| | tax and public charge | 8 | CT44 | | | 26 | | carry-over | | 43 | |
| | packing and transportation costs | 9 | CT38 | | | 27 | | | | 44 | |
| | water line and newspaper | 10 | CT39 | | | 28 | | | total | 45 | DR15 |
| expense | traveling expenses | 11 | CT47 | | | 29 | | | income before deduction for blue return | 46 | DN25+DR13-DR19 |
| | communication | 12 | CT41 | | car | 30 | CT49 | | deduction for blue return | 47 | |
| | ad and telephone | 13 | CT42 | | oil | 31 | CT50 | | | | |
| | reception and company | 14 | CT48 | | sundry | 32 | CX51 | | income | 48 | DR20 |
| | property insurance | 15 | CT43 | | total | 33 | * | | | | |
| | repair | 16 | | | | | | | | | |
| | consumable and stationary | 17 | CT40 | | balance | 34 | DJ16-DN24 | * @SUM(DP9..DP23)+@SUM(DL17..DL26) | | | |

BALANCE SHEET

| | ASSET | | | | liabilities | |
|---|---|---|---|---|---|---|
| TITLE | BEGINNING OF TERM | END OF TERM | TITLE | BEGINNING OF TERM | END OF TERM |
| CASH | BW60 | CZ24 | bill payable | BW77 | DD37 |
| CURRENT DEPOSIT | BW58+BW61 | CZ22+CZ25 | account payable | BW64 | DD28 |
| TIME DEPOSIT | | | loan | BW73 | DD33 |
| OTHER DEPOSIT | BW59 | CZ23 | amount outstanding | | |
| BILL RECEIVABLE | BW76 | CZ36 | advance received | BW75 | DD35 |
| ACCOUNT RECEIVABLE | BW63 | CZ27 | deposit received | BW81 | DD41 |
| STOCKS AND BONDS | | | capital increase | | |
| INVENTORY ASSET | BW67 | CZ30 | | | |
| ADVANCE PAYMENT | | | | | |
| LOAN | BW74 | CZ34 | | | |
| · BUILDING | | | | | |
| · BUILDING FACILITY | | | | | |
| · MACHINERY | | | bond special account | | |
| · VEHICLE | | | allowance for bad debt | BW82 | DD42 |
| · TOOL AND INSTRUMENT FIXTURES | | | carry-back | | -CZ43 |
| · REAL ESTATE | | | carry-over | | DD43 |
| MARK · SUBTOTAL | BW78 | CZ38 | | | |
| CAPITAL SUBSCRIPTION | BW79 | CZ39 | | | |
| INVESTEMET | BW80 | CZ40 | | | |
| CAPITAL REDUCTION | | | owner's debit | ----- | ----- |
| | | | capital invested | BW71 | DP55 |
| owner's credit | ----- | CZ32 | income before deduction for blue return | | -CZ47 |
| total | @SUM(DI35..DI55) | @SUM(DL35..DL55) | total | @SUM(DP35..DP56) | @SUM(DR35..DR56) | calculation of next capital invested

| | | |
|---|---|---|
| | capital invested | DR55 |
| DL56 | owner's credit | |
| | owner's debit | DR54 |
| | income before deduction for blue return | DR56 |
| | capital reduction and increase | DR40 |
| | next capital invested | DR63+DR65+DR67-DN64+DR69 |

Fig. 8

| IDS | DT | DU | DW | DY | DZ | EA | EC | EE | F | EG |
|---|---|---|---|---|---|---|---|---|---|---|
| 2 | | | ⑧ | business analysis | | | | | | |
| 3 | | | | | | | | | | |
| 4 | | | current income (yearly) | upper | middle | lower | DR56 | | | |
| 5 | ① | profit ratio of capital | capital | | | | DR55 | | | summary |
| 6 | | | | 8 | 5 | 3 | | | | |
| 7 | | assessed percentage | capital asset | | | | DL51 | | | |
| 8 | 2 | of classification of | total capital | | | | DR57 | | | ◆This table reveals |
| 9 | | assets to total assets | | 20 | 40 | 90 | | | | cumulative numerals. |
| 10 | | | net worth | | | | DD31+DD42 | | | not yearly ones. |
| 11 | 3 | net worth ratio | total capital | | | | EC8 | | | |
| 12 | | | | 80 | 35 | 20 | | | | |
| 13 | | | capital asset | | | | EC7 | | | ◆Therefore. it is |
| 14 | ④ | fixed assets ratio | net worth | | | | EC10 | | | proper to see at |
| 15 | | | | 50 | 180 | 250 | | | | the end of the year. |
| 16 | | | floating asset | | | | @SUM(DL35..DL44) | | | |
| 17 | ⑤ | liquid ratio | floating debt | | | | DR57-DR55 | | | |
| 18 | | | | 200 | 70 | 40 | | | | ◆The ratio criteria |
| 19 | | ratio of | operating profit | | | | DI16 | | | are not absolute. |
| 20 | 6 | operating profit | net sales | | | | DJ9 | | | Set your criteria. |
| 21 | | to net sales | | 7 | 5 | 3 | | | | |
| 22 | | ratio of | declared profit | | | | DR23 | | | |
| 23 | 7 | declared profit | net sales | | | | DJ9 | | | |
| 24 | | to net sales | | 6 | 4 | 2 | | | | |
| 25 | | ratio of | current income | | | | DR23 | | | |
| 26 | 8 | current income | net sales | | | | DJ9 | | | |
| 27 | | to net sales | | 4 | 2 | 1 | | | | |
| 28 | | turnover of | net sales (yearly) | | | | DJ9 | | | |
| 29 | 9 | total capital | total capital | | | | DR57 | | | |
| 30 | | | | 2.5 | 1.8 | 1.2 | | | | |
| 31 | | sales growth | current net sales | | | | DJ9 | | | |
| 32 | ⑩ | rate | previous net sales | | | | additional entry | | | |
| 33 | | | | 1.05 | 1 | 0.8 | | | | |

| | upper middle lower | upper middle lower | upper middle lower | upper middle lower | upper middle lower | upper middle lower |
|---|---|---|---|---|---|---|
| ① profit ratio of capital | ○ ○ ○ ○ | ○ ○ ○ ○ | ○ ○ ○ ○ | ○ ○ ○ ○ | ○ ○ ○ ○ | ○ ○ ○ ○ |
| ④ fixed ratio | | | | | | |
| ⑤ current ratio | | | | | | |
| ⑩ sales growth rate | excellenc | high return | geniu | maturity | failur | steadiness |

Fig. 9(a)

| | 1 account receivable | 21 interest | 31 business trip |
|---|---|---|---|
| set range for printing and spreading | 2 account payable | 22 transportation cost | 32 entertainment expense |
| (1) - 1 A 1 - M 88    (3) AL 1 - AX 88 | 3 debt | 23 newspaper | 33 car |
| (1) - 2 A 91 - M 178  (4) BA 1 - BR 88 | 4 loan | 24 stationery | 34 oil |
| (1) - 3 A 181 - M 268 (5) BS 1 - CP 88 | 5 owner's credit | 25 communication | 35 sundry |
| (1) - 4 A 271 - M 358 (6) CQ 1 - DE 88 | 6 deposit money | 26 telephone bill | 36 bad debt |
| (1) - 5 A 361 - M 448 (7) DF 1 - DR 88 | 7 bill receivable | 27 insurance | 37 discount |
| (1) - 6 A 451 - M 538 (8) DS 1 - EG 88 | 8 bill payable | 28 tax | |
| (2)   Q 1 - AI 88 | 9 advance | 29 salary | |
| ①-1 financial management | 10 capital subscription | 30 welfare | |

| yr | mo. | da. | summary | * | bank | post office | cash | checking | | balance |
|---|---|---|---|---|---|---|---|---|---|---|
| 11 | 1 | 1 | carryover | | 1,000,000 | 5,000,000 | 30,000,000 | 20,000,000 | | 56,000,000 |
| | | | total | | 1,000,000 | 5,000,000 | 30,000,000 | 20,000,000 | 0 | 56,000,000 |

Fig. 9(b)

| | yr. | mo. | da. | summary | * | | bank | post office | cash | checking | | balance |
|---|---|---|---|---|---|---|---|---|---|---|---|---|
| 91 | ①-2 | | | | | | | | | | | |
| 92 | ★ | ★ | ★ | ★ | | ★ | ★ | ★ | ★ | ★ | ★ | |
| 93 | yr. | mo. | da. | summary | * | | bank | post office | cash | checking | | balance |
| 94 | | | | from previous page | | | 1,000,000 | 5,000,000 | 30,000,000 | 20,000,000 | 0 | 56,000,000 |
| 95 | 11 | 1 | 4 | | 1 | * | 5,000,000 | | | | | 61,000,000 |
| 96 | | | 5 | | 2 | * | | -2,000,000 | | | | 59,000,000 |
| 97 | | | 6 | | 3 | * | | | | 1,500,000 | | 60,500,000 |
| 98 | | | 7 | | 4 | * | | | -1,300,000 | | | 59,200,000 |
| 99 | | | 8 | | 31 | * | | | -150,000 | | | 59,050,000 |
| ... | | | 9 | | 32 | * | | | -200,000 | | | 58,850,000 |
| | | | | total | | * | 6,000,000 | 3,000,000 | 28,350,000 | 21,500,000 | 0 | 58,850,000 |

Fig. 10

| | | product code | customer code | quantity | amount |
|---|---|---|---|---|---|
| | mo. | da. | | | |
| carryover | | *** | *** | ***** | 0 |
| | 1 | 5 | 1 | 2 | 2000 | 1,000,000 |
| | | | 0 | 2 | | 50,000 |
| | 7 | 2 | 3 | 4000 | 800,000 |
| | | | 0 | 3 | | 40,000 | purchase

| product code | | customer code | |
|---|---|---|---|
| 0 | consumption tax | | |
| 1 | notebook | 1 | |
| 2 | ruler | 2 | Fuji Stationary | 2 |
| 3 | ball-point pen | 3 | Asahi Commercial Co. | 3 |
| 4 | paper holder | 4 | | 4 |
| 5 | | 5 | | 5 | commercial co. |
| 6 | | 6 | | 6 | |
| 7 | | 7 | | 7 | American |

(2) purchase and sales management

| | | product code | customer code | quantity | amount |
|---|---|---|---|---|---|
| | mo | da | | | |
| carryover | | *** | *** | ***** | 0 |
| | 1 | 10 | 3 | 5 | 50000 | 5,000,000 |
| | | | 0 | 5 | | 250,000 |
| | | 12 | 4 | 7 | 30000 | 15,000,000 |
| | | | 0 | 7 | | 750,000 | sales total 1,890,000 total 21,000,000

Fig. 11

| | AM | AN | AO | AP | AQ | AR | AS | AT | AU | AV | AW | AX |
|---|---|---|---|---|---|---|---|---|---|---|---|---|
| 1 | | ⓒ | | | | ③ | | | merchandise management | | | |
| 2 | | carryover | | | purchase | | sales | | balance (merchandise profit) | | inventory on book | |
| 3 | quantity | amount | | | quantity | amount | quantity | amount | quantity | amount | @ | amount |
| 4 | . . . . | 0 | consumption tax | 0 | . . . . | 90,000 | . . . . | 1,000,000 | . . . . | 910,000 | . . | . . . . . |
| 5 | 20,000 | 10,000,000 | notebook | 1 | 2,000 | 1,000,000 | 0 | 0 | 22,000 | -11,000,000 | 500 | . . . . . |
| 6 | 20,000 | 4,000,000 | ruler | 2 | 4,000 | 800,000 | 0 | 0 | 24,000 | -4,800,000 | 200 | 11,000,000 |
| 7 | 75,000 | 6,000,000 | ball-point pen | 3 | 0 | 0 | 50,000 | 5,000,000 | 25,000 | -1,000,000 | 80 | 4,800,000 |
| 8 | 50,000 | 20,000,000 | paper holder | 4 | 0 | 0 | 30,000 | 15,000,000 | 20,000 | -5,000,000 | 400 | 2,000,000 |
| 9 | | | | 5 | 0 | 0 | 0 | 0 | | | 90 | 8,000,000 |
| 10 | | | | 6 | 0 | 0 | 0 | 0 | | | 65 | |
| 11 | | | | 7 | 0 | 0 | 0 | 0 | | | 3 | |
| 12 | | | | 8 | 0 | 0 | 0 | 0 | | | 36 | |
| 13 | | | | 9 | 0 | 0 | 0 | 0 | | | 15 | |
| 14 | | | | 10 | 0 | 0 | 0 | 0 | | | 60 | |
| 15 | | | | 11 | 0 | 0 | 0 | 0 | | | 21 | |
| 16 | | | | 12 | 0 | 0 | 0 | 0 | | | 80 | |
| 17 | | | | 13 | 0 | 0 | 0 | 0 | | | 30 | |
| 18 | | | | 14 | 0 | 0 | 0 | 0 | | | 170 | |
| 19 | | | | 15 | 0 | 0 | 0 | 0 | | | | |
| 20 | | | | 16 | 0 | 0 | 0 | 0 | | | | |
| 21 | | | | 17 | 0 | 0 | 0 | 0 | | | 30 | |
| 22 | | | | 18 | 0 | 0 | 0 | 0 | | | 40 | |
| 23 | | | | 19 | 0 | 0 | 0 | 0 | | | 50 | |
| 24 | | | | 20 | 0 | 0 | 0 | 0 | | | 20 | |
| 25 | | | | 21 | 0 | 0 | 0 | 0 | | | 40 | |
| 26 | | | | 22 | 0 | 0 | 0 | 0 | | | | |
| 27 | | | | 23 | 0 | 0 | 0 | 0 | | | 1.6 | |
| 28 | | | | 24 | 0 | 0 | 0 | 0 | | | 3 | |
| 29 | | | | 25 | 0 | 0 | 0 | 0 | | | 3.6 | |
| 30 | | | | 26 | 0 | 0 | 0 | 0 | | | 4.3 | |
| 31 | | | | 27 | 0 | 0 | 0 | 0 | | | 4.6 | |
| 32 | | | | 28 | 0 | 0 | 0 | 0 | | | 4.6 | |
| 33 | | | | 29 | 0 | 0 | 0 | 0 | | | 4.95 | |
| 34 | | | | 30 | 0 | 0 | 0 | 0 | | | 2.5 | |
| 35 | | | | 31 | 0 | 0 | 0 | 0 | | | 4.5 | |
| 36 | | | | 32 | 0 | 0 | 0 | 0 | | | | |
| 37 | | | | 33 | 0 | 0 | 0 | 0 | | | 4.4 | |
| 38 | | | | 34 | 0 | 0 | 0 | 0 | | | 2.15 | |
| 39 | | | | 35 | 0 | 0 | 0 | 0 | | | 1.1 | |
| 40 | | | | 36 | 0 | 0 | 0 | 0 | | | 5.9 | |
| 41 | | | | 37 | 0 | 0 | 0 | 0 | | | 4.7 | |
| 42 | | | | 38 | 0 | 0 | 0 | 0 | | | 12 | |
| 43 | | | | 39 | 0 | 0 | 0 | 0 | | | 1.2 | |
| 44 | | | | 40 | 0 | 0 | 0 | 0 | | | 180 | |
| 45 | | | | 41 | 0 | 0 | 0 | 0 | | | 180 | |
| 46 | | | | 42 | 0 | 0 | 0 | 0 | | | 150 | |
| 47 | | | | 43 | 0 | 0 | 0 | 0 | | | 600 | |
| 48 | | | | 44 | 0 | 0 | 0 | 0 | | | 750 | |
| 49 | | | | 45 | 0 | 0 | 0 | 0 | | | 750 | |
| 50 | | | | 46 | 0 | 0 | 0 | 0 | | | 32 | |
| 51 | | | | 47 | 0 | 0 | 0 | 0 | | | 31 | |
| 52 | | | | 48 | 0 | 0 | 0 | 0 | | | 31 | |
| 53 | | | | 49 | 0 | 0 | 0 | 0 | | | 1.7 | |
| 54 | | | | 50 | 0 | 0 | 0 | 0 | | | 3 | |
| 55 | | | | 51 | 0 | 0 | 0 | 0 | | | 6.5 | |
| 56 | | | | 52 | 0 | 0 | 0 | 0 | | | 270 | |
| 57 | | | | 53 | 0 | 0 | 0 | 0 | | | 300 | |
| 58 | | | | 54 | 0 | 0 | 0 | 0 | | | 300 | |
| 59 | | | | 55 | 0 | 0 | 0 | 0 | | | 15 | |
| 60 | | | | 56 | 0 | 0 | 0 | 0 | | | 10 | |
| 61 | | | | 57 | 0 | 0 | 0 | 0 | | | 10 | |
| 62 | | | | 58 | 0 | 0 | 0 | 0 | | | 2.7 | |
| 63 | | | | 59 | 0 | 0 | 0 | 0 | | | 4.8 | |
| 64 | | | | 60 | 0 | 0 | 0 | 0 | | | 4.8 | |
| 65 | | | | 61 | 0 | 0 | 0 | 0 | | | 60 | |
| 66 | | | | 62 | 0 | 0 | 0 | 0 | | | 150 | |
| 67 | | | | 63 | 0 | 0 | 0 | 0 | | | | |
| 68 | | | | 64 | 0 | 0 | 0 | 0 | | | | |
| 69 | | | | 65 | 0 | 0 | 0 | 0 | | | | |
| 70 | | | | 66 | 0 | 0 | 0 | 0 | | | | |
| 71 | | | | 67 | 0 | 0 | 0 | 0 | | | | |
| 72 | | | | 68 | 0 | 0 | 0 | 0 | | | | |
| 73 | | | | 69 | 0 | 0 | 0 | 0 | | | | |
| 74 | | | | 70 | 0 | 0 | 0 | 0 | | | | |
| 75 | | | | 71 | 0 | 0 | 0 | 0 | | | | |
| 76 | | | | 72 | 0 | 0 | 0 | 0 | | | | |
| 77 | | | | 73 | 0 | 0 | 0 | 0 | | | | |
| 78 | | | | 74 | 0 | 0 | 0 | 0 | | | | |
| 79 | | | | 75 | 0 | 0 | 0 | 0 | | | | |
| 80 | | | | 76 | 0 | 0 | 0 | 0 | | | | |
| 81 | | | | 77 | 0 | 0 | 0 | 0 | | | | |
| 82 | | | | 78 | 0 | 0 | 0 | 0 | | | | |
| 83 | | | | 79 | 0 | 0 | 0 | 0 | | | | |
| 84 | | | | 80 | 0 | 0 | 0 | 0 | | | | |
| 85 | | | | 81 | 0 | 0 | 0 | 0 | | | | |
| 86 | | | | | | | | | | | | |
| 87 | | | | | | | | | | | | |
| 88 | 165,000 | 40,000,000 | | total | 6,000 | 1,890,000 | 80,000 | 21,000,000 | 91,000 | -20,890,000 | | 25,800,000 |

Fig. 12

| BA | BB | BC | BE | BF | BH | BI | BK | BL | BN | BO | BQ | BR |
|---|---|---|---|---|---|---|---|---|---|---|---|---|
| 1 | | | | | | | | | | | | |
| 2 | | | | (4) | customer management | | | | | | | |
| 3 | | supplier | | distributor | | distributor | | distributor | | distributor | | distributor |
| 4 | 1 | 0 | 1 | 0 | 85 | 0 | 169 | 0 | 253 | 0 | 337 | 0 |
| 5 | 2 | 1050000 | 2 | 0 | 86 | 0 | 170 | 0 | 254 | 0 | 338 | 0 |
| 6 | 3 | 840000 | 3 | 0 | 87 | 0 | 171 | 0 | 255 | 0 | 339 | 0 |
| 7 | 4 | 0 | 4 | 0 | 88 | 0 | 172 | 0 | 256 | 0 | 340 | 0 |
| 8 | 5 | 0 | 5 | 5250000 | 89 | 0 | 173 | 0 | 257 | 0 | 341 | 0 |
| 9 | 6 | 0 | 6 | 0 | 90 | 0 | 174 | 0 | 258 | 0 | 342 | 0 |
| 10 | 7 | 0 | 7 | 15750000 | 91 | 0 | 175 | 0 | 259 | 0 | 343 | 0 |
| 11 | 8 | 0 | 8 | 0 | 92 | 0 | 176 | 0 | 260 | 0 | 344 | 0 |
| 12 | 9 | 0 | 9 | 0 | 93 | 0 | 177 | 0 | 261 | 0 | 345 | 0 |
| 13 | 10 | 0 | 10 | 0 | 94 | 0 | 178 | 0 | 262 | 0 | 346 | 0 |
| 14 | 11 | 0 | 11 | 0 | 95 | 0 | 179 | 0 | 263 | 0 | 347 | 0 |
| 15 | 12 | 0 | 12 | 0 | 96 | 0 | 180 | 0 | 264 | 0 | 348 | 0 |
| 16 | 13 | 0 | 13 | 0 | 97 | 0 | 181 | 0 | 265 | 0 | 349 | 0 |
| 17 | 14 | 0 | 14 | 0 | 98 | 0 | 182 | 0 | 266 | 0 | 350 | 0 |
| 18 | 15 | 0 | 15 | 0 | 99 | 0 | 183 | 0 | 267 | 0 | 351 | 0 |
| 19 | 16 | 0 | 16 | 0 | 100 | 0 | 184 | 0 | 268 | 0 | 352 | 0 |
| 20 | 17 | 0 | 17 | 0 | 101 | 0 | 185 | 0 | 269 | 0 | 353 | 0 |
| 21 | 18 | 0 | 18 | 0 | 102 | 0 | 186 | 0 | 270 | 0 | 354 | 0 |
| 22 | 19 | 0 | 19 | 0 | 103 | 0 | 187 | 0 | 271 | 0 | 355 | 0 |
| 23 | 20 | 0 | 20 | 0 | 104 | 0 | 188 | 0 | 272 | 0 | 356 | 0 |
| 24 | 21 | 0 | 21 | 0 | 105 | 0 | 189 | 0 | 273 | 0 | 357 | 0 |
| 25 | 22 | 0 | 22 | 0 | 106 | 0 | 190 | 0 | 274 | 0 | 358 | 0 |
| 26 | 23 | 0 | 23 | 0 | 107 | 0 | 191 | 0 | 275 | 0 | 359 | 0 |
| 27 | 24 | 0 | 24 | 0 | 108 | 0 | 192 | 0 | 276 | 0 | 360 | 0 |
| 28 | 25 | 0 | 25 | 0 | 109 | 0 | 193 | 0 | 277 | 0 | 361 | 0 |
| 29 | 26 | 0 | 26 | 0 | 110 | 0 | 194 | 0 | 278 | 0 | 362 | 0 |
| 30 | 27 | 0 | 27 | 0 | 111 | 0 | 195 | 0 | 279 | 0 | 363 | 0 |
| 31 | 28 | 0 | 28 | 0 | 112 | 0 | 196 | 0 | 280 | 0 | 364 | 0 |
| 32 | 29 | 0 | 29 | 0 | 113 | 0 | 197 | 0 | 281 | 0 | 365 | 0 |
| 33 | 30 | 0 | 30 | 0 | 114 | 0 | 198 | 0 | 282 | 0 | 366 | 0 |
| 34 | 31 | 0 | 31 | 0 | 115 | 0 | 199 | 0 | 283 | 0 | 367 | 0 |
| 35 | 32 | 0 | 32 | 0 | 116 | 0 | 200 | 0 | 284 | 0 | 368 | 0 |
| 36 | 33 | 0 | 33 | 0 | 117 | 0 | 201 | 0 | 285 | 0 | 369 | 0 |
| 37 | 34 | 0 | 34 | 0 | 118 | 0 | 202 | 0 | 286 | 0 | 370 | 0 |
| 38 | 35 | 0 | 35 | 0 | 119 | 0 | 203 | 0 | 287 | 0 | 371 | 0 |
| 39 | 36 | 0 | 36 | 0 | 120 | 0 | 204 | 0 | 288 | 0 | 372 | 0 |
| 40 | 37 | 0 | 37 | 0 | 121 | 0 | 205 | 0 | 289 | 0 | 373 | 0 |
| 41 | 38 | 0 | 38 | 0 | 122 | 0 | 206 | 0 | 290 | 0 | 374 | 0 |
| 42 | 39 | 0 | 39 | 0 | 123 | 0 | 207 | 0 | 291 | 0 | 375 | 0 |
| 43 | 40 | 0 | 40 | 0 | 124 | 0 | 208 | 0 | 292 | 0 | 376 | 0 |
| 44 | 41 | 0 | 41 | 0 | 125 | 0 | 209 | 0 | 293 | 0 | 377 | 0 |
| 45 | 42 | 0 | 42 | 0 | 126 | 0 | 210 | 0 | 294 | 0 | 378 | 0 |
| 46 | 43 | 0 | 43 | 0 | 127 | 0 | 211 | 0 | 295 | 0 | 379 | 0 |
| 47 | 44 | 0 | 44 | 0 | 128 | 0 | 212 | 0 | 296 | 0 | 380 | 0 |
| 48 | 45 | 0 | 45 | 0 | 129 | 0 | 213 | 0 | 297 | 0 | 381 | 0 |
| 49 | 46 | 0 | 46 | 0 | 130 | 0 | 214 | 0 | 298 | 0 | 382 | 0 |
| 50 | 47 | 0 | 47 | 0 | 131 | 0 | 215 | 0 | 299 | 0 | 383 | 0 |
| 51 | 48 | 0 | 48 | 0 | 132 | 0 | 216 | 0 | 300 | 0 | 384 | 0 |
| 52 | 49 | 0 | 49 | 0 | 133 | 0 | 217 | 0 | 301 | 0 | 385 | 0 |
| 53 | 50 | 0 | 50 | 0 | 134 | 0 | 218 | 0 | 302 | 0 | 386 | 0 |
| 54 | 51 | 0 | 51 | 0 | 135 | 0 | 219 | 0 | 303 | 0 | 387 | 0 |
| 55 | 52 | 0 | 52 | 0 | 136 | 0 | 220 | 0 | 304 | 0 | 388 | 0 |
| 56 | 53 | 0 | 53 | 0 | 137 | 0 | 221 | 0 | 305 | 0 | 389 | 0 |
| 57 | 54 | 0 | 54 | 0 | 138 | 0 | 222 | 0 | 306 | 0 | 390 | 0 |
| 58 | 55 | 0 | 55 | 0 | 139 | 0 | 223 | 0 | 307 | 0 | 391 | 0 |
| 59 | 56 | 0 | 56 | 0 | 140 | 0 | 224 | 0 | 308 | 0 | 392 | 0 |
| 60 | 57 | 0 | 57 | 0 | 141 | 0 | 225 | 0 | 309 | 0 | 393 | 0 |
| 61 | 58 | 0 | 58 | 0 | 142 | 0 | 226 | 0 | 310 | 0 | 394 | 0 |
| 62 | 59 | 0 | 59 | 0 | 143 | 0 | 227 | 0 | 311 | 0 | 395 | 0 |
| 63 | 60 | 0 | 60 | 0 | 144 | 0 | 228 | 0 | 312 | 0 | 396 | 0 |
| 64 | 61 | 0 | 61 | 0 | 145 | 0 | 229 | 0 | 313 | 0 | 397 | 0 |
| 65 | 62 | 0 | 62 | 0 | 146 | 0 | 230 | 0 | 314 | 0 | 398 | 0 |
| 66 | 63 | 0 | 63 | 0 | 147 | 0 | 231 | 0 | 315 | 0 | 399 | 0 |
| 67 | 64 | 0 | 64 | 0 | 148 | 0 | 232 | 0 | 316 | 0 | 400 | 0 |
| 68 | 65 | 0 | 65 | 0 | 149 | 0 | 233 | 0 | 317 | 0 | 401 | 0 |
| 69 | 66 | 0 | 66 | 0 | 150 | 0 | 234 | 0 | 318 | 0 | 402 | 0 |
| 70 | 67 | 0 | 67 | 0 | 151 | 0 | 235 | 0 | 319 | 0 | 403 | 0 |
| 71 | 68 | 0 | 68 | 0 | 152 | 0 | 236 | 0 | 320 | 0 | 404 | 0 |
| 72 | 69 | 0 | 69 | 0 | 153 | 0 | 237 | 0 | 321 | 0 | 405 | 0 |
| 73 | 70 | 0 | 70 | 0 | 154 | 0 | 238 | 0 | 322 | 0 | 406 | 0 |
| 74 | 71 | 0 | 71 | 0 | 155 | 0 | 239 | 0 | 323 | 0 | 407 | 0 |
| 75 | 72 | 0 | 72 | 0 | 156 | 0 | 240 | 0 | 324 | 0 | 408 | 0 |
| 76 | 73 | 0 | 73 | 0 | 157 | 0 | 241 | 0 | 325 | 0 | 409 | 0 |
| 77 | 74 | 0 | 74 | 0 | 158 | 0 | 242 | 0 | 326 | 0 | 410 | 0 |
| 78 | 75 | 0 | 75 | 0 | 159 | 0 | 243 | 0 | 327 | 0 | 411 | 0 |
| 79 | 76 | 0 | 76 | 0 | 160 | 0 | 244 | 0 | 328 | 0 | 412 | 0 |
| 80 | 77 | 0 | 77 | 0 | 161 | 0 | 245 | 0 | 329 | 0 | 413 | 0 |
| 81 | 78 | 0 | 78 | 0 | 162 | 0 | 246 | 0 | 330 | 0 | 414 | 0 |
| 82 | 79 | 0 | 79 | 0 | 163 | 0 | 247 | 0 | 331 | 0 | 415 | 0 |
| 83 | 80 | 0 | 80 | 0 | 164 | 0 | 248 | 0 | 332 | 0 | 416 | 0 |
| 84 | 81 | 0 | 81 | 0 | 165 | 0 | 249 | 0 | 333 | 0 | 417 | 0 |
| 85 | 82 | 0 | 82 | 0 | 166 | 0 | 250 | 0 | 334 | 0 | 418 | 0 |
| 86 | 83 | 0 | 83 | 0 | 167 | 0 | 251 | 0 | 335 | 0 | | |
| 87 | 84 | 0 | 84 | 0 | 168 | 0 | 252 | 0 | 336 | 0 | (5)total | 0 |
| 88 | total | 1890000 | ①total | 21000000 | ②total | 0 | ③total | 0 | ④total | 0 | total | 21000000 |

Fig. 13

| | BW | BZ | CA | | CJ | CL | CN | CP |
|---|---|---|---|---|---|---|---|---|
| | balance management | | expense management | (5) | | bill management | | |
| | | | | | ★ | | ★ | |
| | | | | | bill payable | issued | bill receivable | accepted |
| account receivable | 5,000,000 | interest | 0 | | 3,000,000 | | 2,500,000 | |
| account payable | -2,000,000 | ion cost | 0 | | | | | |
| debt | 1,500,000 | newspaper | 0 | | | | | |
| loan | -1,300,000 | stationery | 0 | | | | | |
| owner's credit | 0 | communicatio | 0 | | | | | |
| deposit money | 0 | bill | 0 | | | | | |
| bill receivable | 0 | insurance | 0 | | | | | |
| bill payable | 0 | tax | 0 | | | | | |
| advance | 0 | salary | 0 | | | | | |
| capital subscription | 0 | welfare | 0 | | | | | |
| | 0 | business tri | -150,000 | | | | | |
| | 0 | entertainment expense | -200,000 | | | | | |
| | 0 | car | 0 | | | | | |
| | 0 | oil | 0 | | | | | |
| | 0 | sundry | 0 | | | | | |
| | 0 | bad debt | 0 | | | | | |
| | 0 | discount | 0 | | | | | |
| | 0 | | 0 | | | | | |
| | | | 0 | | | | | |
| | | | 0 | | | | | |
| | | | 0 | | | | | |
| | | | 0 | | | | | |
| | | | 0 | | | | | |
| | | | 0 | | | | | |
| total balance | 3,200,000 | total expense | -350,000 | | | 3,000,000 | | 2,500,000 |
| last-term balance | 56,000,000 | today's balance | 58,850,000 | | | | | |

58,850,000  A+B+C+D data

| | | last term-end | | term-end of this month | |
|---|---|---|---|---|---|
| bank | ○ | 1,000,000 | | 6,000,000 | A |
| post office | ○ | 5,000,000 | | 3,000,000 | B |
| cash | ○ | 30,000,000 | | 28,350,000 | C |
| checking | ○ | 20,000,000 | | 21,500,000 | D |
| account receivable | ○ | 50,000,000 | | 63,500,000 | |
| account payable | ○ | 20,000,000 | | 16,890,000 | |
| sales | | | | 21,000,000 | |
| purchase | | | | 1,890,000 | |
| inventory | ○ | 40,000,000 | | 25,800,000 | |
| expense | | | | 350,000 | |
| capital | ○ | 148,000,000 | | 148,000,000 | |
| owner's credit | | | | 0 | |
| debt | ○ | 15,000,000 | | 16,500,000 | |
| loan | ○ | 13,000,000 | | 14,300,000 | |
| advance | ○ | | | 0 | |
| bill receivable | ○ | | | 2,500,000 | |
| bill payable | ○ | | | 3,000,000 | |
| capital asset | ○ | 24,000,000 | | 24,000,000 | |
| subscription | ○ | | | 0 | |
| investment | ○ | | | 0 | |
| deposit | ○ | | | 0 | |
| allowance | ○ | | | | |
| bill receivable accepted | | | | 2,500,000 | |
| bill payable issued | | | | 3,000,000 | | notice input numeral here according to No. 8 at the time of merging (be sure to delete at the beginning of)

Fig. 14 trial balance

| | | | |
|---|---|---|---|
| 6,000,000 | bank | | |
| 3,000,000 | postal transfer | | |
| 28,350,000 | cash | | |
| 21,500,000 | checking | | |
| 63,500,000 | account receivable | | |
| | account payable | | 16,890,000 |
| | | sales | 21,000,000 |
| | | purchase | 1,890,000 |
| | | initial | 40,000,000 |
| | merchandise profit | | -20,890,000 |
| 350,000 | expense | | |
| | capital | | 148,000,000 |
| 0 | owner's credit | | |
| | debt | | 16,500,000 |
| 14,300,000 | loan | | |
| | advance | 0 | |
| 2,500,000 | bill receivable | | |
| | bill payable | | 3,000,000 |
| 24,000,000 | capital asset | | |
| 0 | capital subscription | | |
| 0 | investment | | |
| | deposit money | 0 | |
| | allowance | 0 | |
| 163,500,000 | total | | 163,500,000 | work sheet

| | | | |
|---|---|---|---|
| interest | 0 | | 0 |
| transportation cost | 0 | | 0 |
| newspaper | 0 | | 0 |
| stationary | 0 | | 0 |
| communication | 0 | | 0 |
| telephone bill | 0 | | 0 |
| insurance | 0 | | 0 |
| tax | 0 | | 0 |
| salary | 0 | | 0 |
| welfare | 0 | | 0 |
| business trip | 150,000 | | 150,000 |
| entertainment expense | 200,000 | -200,000 | 0 |
| car | 0 | | 0 |
| oil | 0 | | 0 |
| sundry | 0 | | 0 |
| bad debt | 0 | | 0 |
| discount | 0 | | 0 |
| total | 350,000 | | 150,000 |
| account payable | 16,890,000 | | 16,890,000 |
| account receivable | 63,500,000 | | 63,500,000 |
| owner's credit | 0 | 200,000 | 200,000 |
| debt | 16,500,000 | | 16,500,000 |
| loan | 14,300,000 | | 14,300,000 |
| capital asset | 24,000,000 | | 24,000,000 |
| deposit money | 0 | | 0 |
| allowance/last term | 0 | | 0 |
| allowance/this term | | | 0 |
| depreciation | | | 0 |
| capital | 148,000,000 | | 148,000,000 | profit and loss statement

| | | | |
|---|---|---|---|
| | sales | | 21,000,000 |
| 1,890,000 | purchase | | |
| 40,000,000 | initial | | |
| | inventory | | 25,800,000 |
| 150,000 | expense | | |
| 0 | carryover | allowance | refund | 0 |
| 0 | depreciation | | |
| | profit and loss | | -4,760,000 |
| 42,040,000 | total | | 42,040,000 | balance sheet

| | | | |
|---|---|---|---|
| 6,000,000 | bank | | |
| 3,000,000 | postal transfer | | |
| 28,350,000 | cash | | |
| 21,500,000 | checking | | |
| 63,500,000 | account receivable | | |
| | account payable | | 16,890,000 |
| 25,800,000 | inventory | | |
| | capital | | 148,000,000 |
| 200,000 | owner's credit | | |
| | debt | | 16,500,000 |
| 14,300,000 | loan | | |
| | advance | | 0 |
| 2,500,000 | bill receivable | | |
| | bill payable | | 3,000,000 |
| 24,000,000 | capital asset | | |
| 0 | capital subscription | | |
| 0 | investment | | |
| | deposit money | | 0 |
| | allowance | | 0 |
| 0 | refund | allowance | carryover | 0 |
| -4,760,000 | profit and loss | | |
| 184,390,000 | total | | 184,390,000 | profit and loss disposition

| | | | |
|---|---|---|---|
| | capital | | 148,000,000 |
| 200,000 | owner's credit | | |
| | deposit money | | 0 |
| -4,760,000 | profit and loss | | |
| | next term capital | | 152,560,000 |

Fig. 15

⑦ income tax return on blue form (taxation office: form)

profit and loss statement

| | title | | settled amount | | title | | settled amount | | title | | settled amount |
|---|---|---|---|---|---|---|---|---|---|---|---|
| | sales amount | 1 | 21,000,000 | | depreciation | 18 | 0 | | allowance for bad debt | 35 | 0 |
| | | | | | employee benefits and welfare | 19 | 0 | carry-back | | 36 | |
| sale cost | initial inventory | 2 | 40,000,000 | | salary and wage | 20 | 0 | | | 37 | |
| | purchase | 3 | 1,890,000 | | interest discount | 21 | 0 | | | 38 | |
| | total | 4 | | | land and house rents | 22 | 0 | | total | 39 | 0 |
| | closing inventory | 5 | 25,800,000 | | bad debt | 23 | 0 | | wage of family employee | 40 | |
| | deducted cost | 6 | 16,090,000 | expense | discount | 24 | 0 | | allowance for bad debt | 41 | 0 |
| | balance | 7 | 4,910,000 | | | 25 | | | | 42 | |
| | tax and public charge | 8 | 0 | | | 26 | | carry-over | | 43 | |
| | packing and transportation costs | 9 | 0 | | | 27 | | | | 44 | |
| | water line and newspaper | 10 | 0 | | | 28 | | | total | 45 | 0 |
| expense | traveling expenses | 11 | 150,000 | | | 29 | | | income before deduction for blue return | 46 | 4,560,000 |
| | communication | 12 | 0 | | car | 30 | 0 | | deduction for blue return | 47 | |
| | ad and telephone | 13 | 0 | | oil | 31 | 0 | | | | |
| | reception and company | 14 | 200,000 | | sundry | 32 | 0 | | income | 48 | 4,560,000 |
| | property insurance | 15 | 0 | | total | 33 | 350,000 | | | | |
| | repair | 16 | | | | | | | | | |
| | consumable and stationary | 17 | 0 | | balance | 34 | 4,560,000 | | | | |

BALANCE SHEET

| | ASSET | | | liabilities | | |
|---|---|---|---|---|---|---|
| | TITLE | BEGINNING OF TERM | END OF TERM | TITLE | BEGINNING OF TERM | END OF TERM |
| | CASH | 30,000,000 | 28,350,000 | bill payable | 0 | 3,000,000 |
| | CURRENT DEPOSIT | 21,000,000 | 27,500,000 | account payable | 20,000,000 | 16,890,000 |
| | TIME DEPOSIT | | | loan | 15,000,000 | 16,500,000 |
| | OTHER DEPOSIT | 5,000,000 | 3,000,000 | amount outstanding | | |
| | BILL RECEIVABLE | 0 | 2,500,000 | advance received | 0 | 0 |
| | ACCOUNT RECEIVABLE | 50,000,000 | 63,500,000 | deposit received | 0 | 0 |
| | STOCKS AND BONDS | | | capital increase | | |
| | INVENTORY ASSET | 40,000,000 | 25,800,000 | | | |
| | ADVANCE PAYMENT | | | | | |
| | LOAN | 13,000,000 | 14,300,000 | | | |
| | ・BUILDING | | | | | |
| | ・BUILDING FACILITY | | | | | |
| | ・MACHINERY | | | bond special account | | |
| | ・VEHICLE | | | allowance for bad debt | 0 | 0 |
| | ・TOOL AND INSTRUMENT FIXTURES | | | carry-back | | 0 |
| | ・REAL ESTATE | | | carry-over | | 0 |
| | MARK・SUBTOTAL | 24,000,000 | 24,000,000 | | | |
| | CAPITAL SUBSCRIPTION | 0 | 0 | | | |
| | INVESTEMET | 0 | 0 | | | |
| | CAPITAL REDUCTION | | | owner's debit | ----- | ----- |
| | | | | capital invested | 148,000,000 | 148,000,000 |
| | owner's credit | ----- | 200,000 | income before deduction for blue return | | 4,760,000 |
| | total | 183,000,000 | 189,150,000 | total | 183,000,000 | 189,150,000 | calculation of next capital invested

| | | |
|---|---|---|
| | capital invested | 148,000,000 |
| 200,000 | owner's credit | |
| | owner's debit | 0 |
| | income before deduction for blue return | 4,760,000 |
| | capital reduction and increase | 0 |
| | next capital invested | 152,560,000 |

Fig. 16 business ratio analysis (8)

| | | | upper | middle | lower | | | | summary |
|---|---|---|---|---|---|---|---|---|---|
| ① | profit ratio of capital | current income (yearly) / capital | 8 | 5 | 3 | 4,760,000 / 148,000,000 | | 3 | |
| 2 | assessed percentage of classification of assets to total assets | capital asset / total capital | 20 | 40 | 90 | 24,000,000 / 189,150,000 | | 13 | ◆This table reveals cumulative numerals, not yearly ones. |
| 3 | net worth ratio | net worth / total capital | 80 | 35 | 20 | 148,000,000 / 189,150,000 | | 78 | ◆Therefore, it is proper to see at the end of the year. |
| ④ | fixed assets ratio | capital asset / net worth | 50 | 180 | 250 | 24,000,000 / 148,000,000 | | 16 | |
| ⑤ | liquid ratio | floating asset / floating debt | 200 | 70 | 40 | 164,950,000 / 41,150,000 | | 401 | ◆The ratio criteria are not absolute. Set your criteria. |
| 6 | ratio of operating profit to net sales | operating profit / net sales | 7 | 5 | 3 | 4,910,000 / 21,000,000 | | 2 | |
| 7 | ratio of declared profit to net sales | declared profit / net sales | 6 | 4 | 2 | 4,560,000 / 21,000,000 | | 2 | |
| 8 | ratio of current income to net sales | current income / net sales | 4 | 2 | 1 | 4,560,000 / 21,000,000 | | 2 | |
| 9 | turnover of total capital | net sales (yearly) / total capital | 2.5 | 1.8 | 1.2 | 21,000,000 / 189,150,000 | | 0.11 | |
| ⑩ | sales growth rate | current net sales / previous net sales | 1.05 | 1 | 0.8 | 21,000,000 | | error | upper |

| | upper middle lower | | upper middle lower | | upper middle lower | | upper middle lower | | upper middle lower | | upper middle lower | |
|---|---|---|---|---|---|---|---|---|---|---|---|---|
| ① profit ratio of capital | ○ | excellenc | ○ | high return | ○ | geniu | ○ | maturity | ○ | failur | ○ | steadiness |
| ④ fixed ratio | ○ | | ○ | | ○ | | ○ | | ○ | | ○ | |
| ⑤ current ratio | ○ | | ○ | | ○ | | ○ | | ○ | | ○ | |
| ⑩ sales growth rate | ○ | | ○ | | ○ | | ○ | | ○ | | ○ | |

COMPUTING METHOD FOR ACCOUNTING

BACKGROUND OF THE INVENTION

1. Field of the Invention

The present invention relates to a computing method for accounting, and more particularly, to a computing method for accounting for use in a simplified closing system, which simplifies accounting operations of the kind that are based on the double-entry bookkeeping method and makes it possible to input a high volume of data simply and instantaneously.

2. Related Arts

Forms of accounting sheets based on the double-entry bookkeeping method are widely used for accounting. Doing double-entry bookkeeping makes the accounting operations complicated and troublesome. That is why many companies and individuals are retaining experts or accountants to do the bookkeeping.

Instead, the personal computer on which a double-entry bookkeeping application is run can also be used to do the bookkeeping electronically, but in this case, the input processing is complicated, or it requires much time to create financial documents.

As matters now stand, however, regardless of whether the companies and individuals have the experts or spend lots of time and cost for accounting operations, what they can obtain will be terminal accounts and monthly trial balance at the most. The statement of accounts and relevant documents, such as account and financial sheets, which are created in the process of settling accounts, are all important, and they should be kept as the past records.

The accounting operations, however, have essentially another intended object of creating the statement of accounts and other accounting documents each time a transaction is input (entered) so that the financial documents can be a "compass for business management" indicating current circumstances and a perspective on future business. Such an essential object cannot be attained in conventional computing methods for accounting because they are incapable of creating the statement of accounts and other documents each time a transaction is entered.

SUMMARY OF THE INVENTION

The present invention has been made to solve the above problems accompanying the conventional computing methods for accounting. It is an object of the present invention to provide a computing method for accounting, capable of offering easy and simple operations.

Another object of the present invention is to provide a computing method for accounting, capable of creating documents or records such as a statement of accounts almost simultaneously with data entry.

Still another object of the present invention is to provide a computing method for accounting, capable of increasing the number of entries vastly. This means that the number of entries is increased to be large enough to response to any practical demands.

The above objects are attained by the provision of a computing method for accounting, comprising:

(a) a first step of installing and storing spreadsheet software capable of creating accounting screens each of which is a matrix of cells including input setting cells and output displaying cells;

(b) a second step of storing functional formulas and/or operational expressions for use in determining, based on numerical values entered in the input setting cells, numerical values to be displayed in the output displaying cells;

(c) a third step of calling the accounting screens of at least N different kinds to develop and arrange the same on the display;

(d) a fourth step of entering a given numerical value in a predetermined input setting cell; and (e) a fifth step of performing predetermined computations, based on the entered, given numerical value, according to the functional formulas and/or operational expressions to display numerical values indicative of the computation results in predetermined output displaying cells so as to complete each of the accounting screens.

In the computing method for accounting, the fourth step may be executed for each unit of transaction at the time of conducting the transaction.

Further, N may be eight.

The accounting screens may include a first screen for entering occurrence of a flow of money.

The accounting screens may include a second screen for entering occurrence of a flow of merchandise.

The accounting screens may include a third screen for displaying the state of merchandise management.

The accounting screens may include a fourth screen for displaying the state of customer management.

The accounting screens may include a fifth screen for displaying the amount listed by title of expense, debit and credit accounts.

The accounting screens may include a sixth screen for displaying closing account or the settlement of accounts.

The accounting screens may include a seventh screen for displaying a statement of accounts written in a predetermined form.

The accounting screens may include an eighth screen for displaying the state of a business ratio analysis.

In the computing method for accounting, the fourth step may be executed for a fiscal period at the beginning-of the fiscal period.

Instead, the fourth step may be executed for a fiscal period at the end of the fiscal period.

The computing method for accounting may further comprise:

(f) a sixth step of creating a second file in addition to a first file in which all the accounting screens completed through the first to fifth steps is stored;

(g) a seventh step of calling the second file after the first file is stored and printed out to spread and arrange the same before the first file is recalled;

(h) an eighth step of performing predetermined computations, based on the accounting method, for the first file recalled in the seventh step; and (i) a ninth step of combining or merging the first file, for which the computations have been performed in the eighth step, into the second file spread and arranged in the seventh step so that the final state of the first file will be handed down to the second file.

BRIEF DESCRIPTION OF THE DRAWINGS

By way of example and to make the description more clear, reference is made to the accompanying drawings, in which:

FIG. 1 is an input screen for accounting operations in which financial management is performed for a transaction;

FIG. 2 is an input screen for accounting operations in which purchase and sales management is performed for the transaction;

FIG. 3 is an input screen for accounting operations in which merchandise management is performed for the transaction;

FIG. 4 is an input screen for accounting operations in which customer management is performed for the transaction;

FIG. 5 is an input screen for accounting operations through which the amounts of transactions are displayed under separate headings for expense, and debit and credit accounts;

FIG. 6 is an input screen for accounting operations through which closing accounts of the transactions are displayed;

FIG. 7 is an input screen for accounting operations through which a statement of accounts of the transactions is displayed in a predetermined form;

FIG. 8 is an input screen for accounting operations through which business ratio analysis of the transactions is displayed;

FIG. 9 is an output screen for accounting operations in which financial management is performed for a transaction;

FIG. 10 is an output screen for accounting operations in which purchase and sales management is performed for the transaction;

FIG. 11 is an output screen for accounting operations in which merchandise management is performed for the transaction;

FIG. 12 is an input screen for accounting operations in which customer management is performed for the transaction;

FIG. 13 is an output screen for accounting operations through which the amounts of transactions are displayed under separate headings for expense, debit and credit accounts;

FIG. 14 is an output screen for accounting operations through which closing accounts of the transactions are displayed;

FIG. 15 is an output screen for accounting operations through which a statement of accounts of the transactions is displayed in a predetermined form; and FIG. 16 is an output screen for accounting operations through which business ratio analysis of the transactions is displayed.

DETAILED DESCRIPTION OF THE PREFERRED EMBODIMENTS

To carry out accounting computations according to the present invention, spreadsheet application software (hereinbelow, called spreadsheet software) must be installed and stored in advance in a personal computer or word processor (hereinbelow, generically called a personal computer). Spreadsheet software of this type includes Lotus 1-2-3 (trade name) and Excel (trade name). Such spreadsheet software allows the present invention to create accounting screens. The accounting screens are of plural screens different from each other in configuration, but basically, each screen is a matrix of cells each of which is either an input setting cell for use in making an entry or an output displaying cell for use in displaying an output. According to the present invention, only numerical values can be entered in the input setting cell. To determine, based on the numerical value entered in the input setting cell, a numerical value to be displayed in the output displaying cell, a functional formula or operational expression must be input and stored in the spreadsheet software beforehand.

The functional formula or operational expression will be described later.

FIGS. 1 through 8 show accounting screens (hereinbelow, called accounting input screens) before numerical values are entered in the input setting cells.

Figure 1:
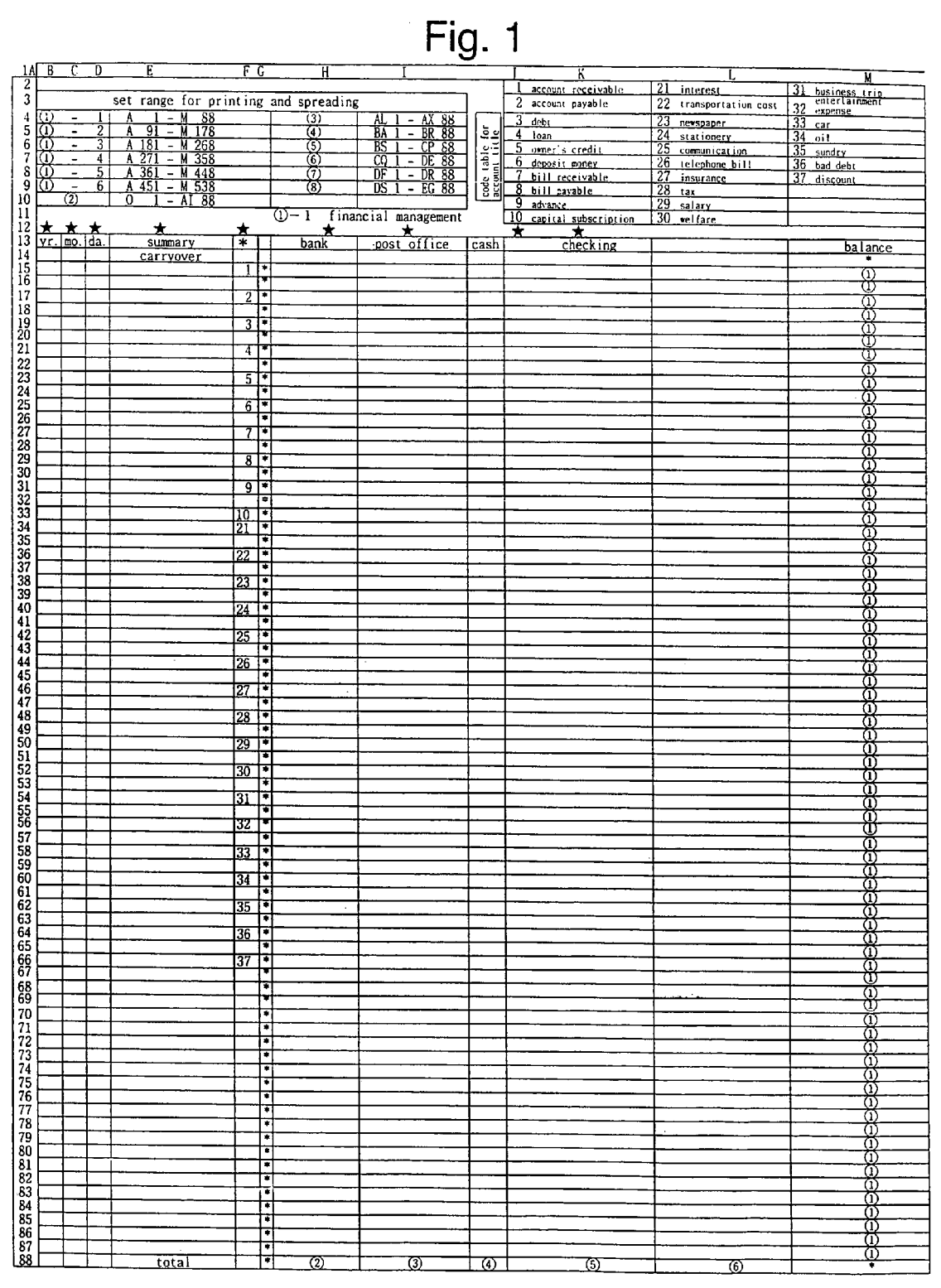

FIG. 1 is called the first screen and operative to perform financial management for a transaction, i.e., it is used to enter an occurrence of a flow of money (e.g., a general deposit, postal a transfer deposit, cash in hand, and a checking (current) deposit).

It displays each balance and the total balance of each account. In addition, a list of set ranges for printing and screen spreading, and a code table for each title of expense, debit and credit accounts are displayed on the screen.

Figure 2:
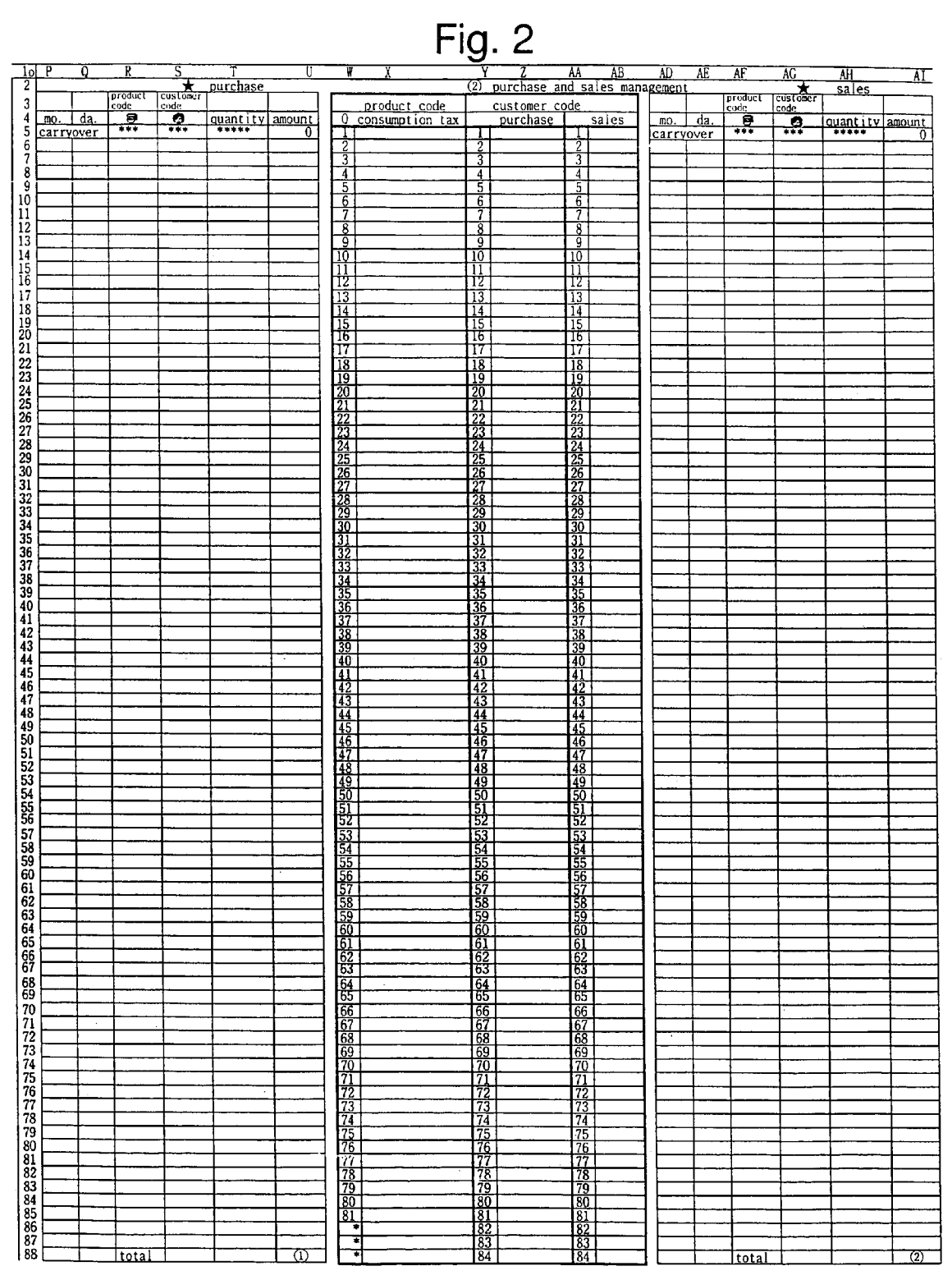

FIG. 2 is called the second screen and operative to perform purchase and sales management for the transaction, i.e., it is used to enter occurrence of a flow of merchandise (purchase and sales).

It also displays a list of product, supplier and distributor codes.

FIG. 3 is called the third screen and operative to perform merchandise management for the transaction. It displays items required for merchandise management.

That is, for the items of balance brought forward, purchase, sales, offset (marginal profit), and inventory (book inventory), the quantity and total amount of products of each kind are displayed.

FIG. 4 is called the fourth screen and operative to perform customer management for the transaction. It displays the amount for each supplier and distributor.

FIG. 5 is called the fifth screen and operative to display the amounts of transactions separately for each title of expense, debit and credit accounts, i.e., it is used to enter the amounts of bills accepted and issued. A region called a data room is also provided so that all data can be integrally handed over to the settlement processing.

FIG. 6 is called the sixth screen and operative to display closing accounts of the transactions. Displayed on the screen are a trial balance, a work sheet, a profit and loss statement, a balance sheet, and a profit and loss disposition.

FIG. 7 is called the seventh screen and operative to display a statement of accounts of the transactions in a predetermined form such as an income tax return on the blue form.

FIG. 8 is called the eighth screen and operative to display business ratio analysis.

The following section describes a method of using the first through eighth screens to carry out accounting computations according to the present invention.

First of all, spreadsheet software is called to spread and arrange the first through eighth screens on the display of a personal computer. The first through eighth screens are arranged in this order from left to right. It should be noted that each screen is designed here to display 22 characters by 88 lines and be printed on a B4 sheet. The first screen comprises six pages arranged longitudinally (pages 1 through 6), but the second through eighth screens are all one page. Each screen is comprised of a matrix of ruled lines to form a large number of cells.

Input or computation results are displayed in the cells. The following illustrates the process of using a functional formula or operational expression prestored in the spreadsheet software to determine a numerical value to be displayed in an output displaying cell from a numerical value entered in an input setting cell, indicating a preset functional formula or operational expression and its input setting position.

First Screen (*)

Operational Expression H15+I15+J15+K15+L15

Meaning

Sum up numerals in H15, I15, J15, K15 and L15 to display the result in the position (*).

Input Position (Cell)

First screen (page 1) G15-G88, M14, M88
First screen (page 2) G95-G178, M178
First screen (page 3) G185-G268, M268
First screen (page 4) G275-G358, M358
First screen (page 5) G365-G448, M448
First screen (page 6) G455-G538, M538
(Numerals of H through L columns are different in each cell)

It should be noted that, since the width of G column is one (minimum) for the sake of drawing arrangement and printing range, the functional formula or operational expression is not displayed in the position (*), but it can be displayed by moving the cell.

①

Functional Formula @IF(@COUNT(H15 . . . L15)=0, " ", +M14+G15)

Meaning

Add the sum of numerals of H15 through L15 to a numeral in M column a line up from raw 15 to display the result in ((①)).

If the sum of H15 through L15 is zero, display the numeral in M column a line up from raw 15 as it is.

Input Position (Cell)

First screen (page 1) M15-M87
First screen (page 2) M95-M177
First screen (page 3) M185-M267
First screen (page 4) M275-M357
First screen (page 5) M365-M447
First screen (page 6) M455-M537
(Numerals of M and G columns are different in each cell)

②

Functional Formula @SUM(H14 . . . H87)

Meaning

Sum up H14 through H87 to display the result in (②).

Input Position (Cell) H88

③-⑪ First screen (page 1) (3)-(6)
First screen (page 2) (7)-(11)
First screen (page 3) (12)-(16)
First screen (page 4) (17)-(21)
First screen (page 5) (22)-(26)
First screen (page 6) (27)-(31)

The above operations conform to ②. See the note below with respect to the first screen (page 2) and the following pages.

Note: Continuation of drawings and how to sum up

Enter and set an operational expression for copying a numeral in H88 cell on the first screen (page 2) to H94 cell on the first screen (page 2). Numerals in I88, J88, K88, L88 and M88 all conform to the same rule.

Enter and set a functional formula: @SUM(H94 . . . H177), because the total on the first screen (page 2) is a "cumulative total" that includes the numeral copied in H94 (i.e., the total on the first screen (page 1)). The other pages are processed the same way.

Second Screen

①

Functional Formula @SUM(U5 . . . U87)

Meaning

Sum up U5 to U87 to display the result in ((①)).

Input Position (Cell) U88

Note: ② conforms to ①.

Code Number

| W1-W81 | Product code number |
| X1-X81 | Product name ○ |
| Y1-Y84 | Supplier code number |
| Z1-Z84 | Supplier name ○ |
| AA1-AA418 | Distributor code number |
| AB1-AB418 | Distributor name ○ |

Mark ○ indicates that the items can be entered, increased or decreased, and changed at the time of bring forward profit and loss from the end of the previous business term. Therefore, they are not protected.

Marks ◉ and ◉ are not merely decorative marks; they are important to set crucial functions. Therefore, the marks need to be protected.

Third Screen

①

Functional Formula @DSUM(R$4 . . . T$88, 2. AK$6 . . . AL$7)

Meaning

Pick up all codes indicative of 1 from a range of R4 to T88, sum up the pickups, and display the sum in AK6 to AL7 to redisplay the same in (①).

(Note that the result is processed as undisplayed item for the sake of screen arrangement)

Input Position (Cell) AQ6-AQ86 (Numerals of AK and AL are different in each cell)

②

Functional Formula @DSUM(R$4 . . . U$88, 3, AK$6 . . . AL$7)

Meaning

Pick up all codes indicative of 1 from a range of R4 to U88, sum up the pickups, and display the sum in AK6 to AL7 to redisplay the same in (②).

(Note that the result is processed as undisplayed item for the sake of screen arrangement)

Input Position (Cell) AR5-AR86 (Numerals of AK and AL are different in each cell)

③

Functional Formula @DSUM(AF$4 . . . AH$88, 2, AK$6 . . . AL$7)

Meaning

Pick up all codes indicative of 1 from a range of AF4 to AH88, sum up the pickups, and display the sum in AK6 to AL7 to redisplay the result in (③).

(Note that the result is processed as undisplayed item for the sake of screen arrangement)

Input Position (Cell) AS6-AS86 (Numerals of AK and AL are different in each cell)

④

Functional Formula @DSUM(AF$4 . . . AI$88, 3, AK$6 . . . AL$7)

Meaning
  Pick up all codes indicative of 1 from a range of AF4 to AI88, sum up the pickups, and display the sum in AK6 to AL7 to redisplay the result in (④).
  (Note that the result is processed as undisplayed item for the sake of screen arrangement)

Input Position (Cell) AT5-AT86 (Numerals of AK and AL are different in each cell)
  ⑤

Operational Expression AM6+AQ6−AS6

Meaning
  Subtract AS6 (quantity of sales) from a value obtained by add AQ6 (quantity of purchase) to AM6 (quantity brought forward) to display the result in (⑤).

Input Position (Cell) AU6-AU86 (Numerals of M, AQ and AS are different in each cell)
  ⑥

Operational Expression AT6−AR6−AN6

Meaning
  Subtract AR6 (amount of purchase) and AN6 (amount brought forward) from AT6 (amount of sales) to display the result in (⑥).

Input Position (Cell) AV5-AV86 (Numerals of AT, AR and AN are different in each cell)
  ⑦

Operational Expression AW6×AU6

Meaning
  Multiply AW6 (@ for inventory) by AU6 (amount of stock) to display the result in (⑦).

Input Position (Cell) AX6-AX86 (Numerals of AW and AU are different in each cell)
  ⑧

Functional Formula @SUM(AM6, AM87)

Meaning
  Sum up AM6 to AM87 to display the result in (8).

Input Position (Cell) AM 88
  ⑨ through ⑯ conform to ⑧.
  A series of numbers 0 through 81 in AP column are code numbers of product names (protected).
  Enter product names in AO column at the time of entering the balance brought forward. They can be increased, decreased or changed (therefore, they are not protected).
  Mark ● is not a merely decorative mark; it is essential to set a crucial function (protected). Further, AK4-AK167 have pre-entries that hold pivotally functional positions therein, but since they deviate from the range for drawing arrangement and printing (and are undisplayed), no one can see what are set in the cells. Yet, they can be displayed by moving the cells to those of AK columns.

Fourth Screen
  ①

Functional Formula @DSUM(S$4 . . . U$88, 2, AZ3 . . . BA4)

Meaning
  Pick up all codes indicative of 1 from a range of S4 to U88, sum up the pickups, and display the sum in AZ3 to BA4 (undisplayed for the sake of screen arrangement) to redisplay the same in (①).

Input Position (Cell) BC6-BC87 (Numerals of AZ and BA are different in each cell)
  ②

Functional Formula @DSUM(AG$4 . . . AI$88, 2, AZ3 . . . BA4)

Meaning
  It conforms to ①.

Input Position (Cell) BF4-BF87
  BI4-BI87
  BL4-BL87
  BO4-BO87
  BR4-BR85
  (Numerals of AZ and BA are different in each cell)
  ③

Functional Formula @SUM(BC$4 . . . BC$87)

Meaning
  Sum up BC4 through BC87 to display the result in ③.

Input Position (Cell) BC88
  ④-⑧
  All conform to ③.

operational Expression BF88+BI88+BL88+BO88+BR87

Meaning
  Add subtotals in BF88, BI88, BL88, BO88 and BR87 to display the total in ⑨.

Input Position (Cell) BR88
  Mark ● is not a merely decorative mark; it is essential to set a crucial function. Therefore, it is protected.
  Further, AZ3-AZ838 have important pre-entries that hold pivotally functional positions therein, but since they deviate from the range for drawing arrangement and printing (and are undisplayed), no one can see what are set in the columns. Yet, they can be displayed by moving the cells to those of AZ columns.
  Regarding the fourth screen, if the printing space is two sheets (B4 size), supplier names and distributor names can be entered beside the code numbers. The second screen can also be set up the same way.
  It should be noted that the "easy settlement system" is designed to put stress on completion of instantaneous settlement by eliminating unimportant details, and hence minimize waste for realizing functions easy to operate to the last.

Fifth Screen

| Meaning | Input Position | Functional formula/ Operational Expression |
|---|---|---|
| The meanings of functional formulas and operational expressions conform to those of the third screen (the description omitted). | 1 | @DSUM($F$13 . . . $G538,1,$BU4 . . . $BV5) |
| | 2 | @DSUM($F$13 . . . $G538,1,$BU6 . . . $BV7) |
| | 3 | @DSUM($F$13 . . . $G538,1,$BU8 . . . $BV9) |
| | 4 | @DSUM($F$13 . . . $G538,1,$BU10 . . . $BV11) |
| | 5 | @DSUM($F$13 . . . $G538,1,$BU12 . . . $BV13) |
| | 6 | @DSUM($F$13 . . . $G538,1,$BU14 . . . $BV15) |
| | 7 | @DSUM($F$13 . . . $G538,1,$BU16 . . . $BV17) |
| | 8 | @DSUM($F$13 . . . $G538,1,$BU18 . . . $BV19) |
| | 9 | @DSUM($F$13 . . . $G538,1,$BU20 . . . $BV21) |
| | 10 | @DSUM($F$13 . . . $G538,1,$BU22 . . . $BV23) |
| | 21 | @DSUM($F$13 . . . $G538,1,$Bx4 . . . $By5) |
| | 22 | @DSUM($F$13 . . . $G538,1,$Bx6 . . . $By7) |
| | 23 | @DSUM($F$13 . . . $G538,1,$Bx8 . . . $By9) |
| | 24 | @DSUM($F$13 . . . $G538,1,$Bx10 . . . $By11) |
| | 25 | @DSUM($F$13 . . . $G538,1,$Bx12 . . . $By13) |

-continued

| Meaning | Input Position | Functional formula/ Operational Expression |
|---------|----------------|---------------------------------------------|
|  | 26 | @DSUM($F$13 ... $G538,1,$Bx14 ... $By15) |
|  | 27 | @DSUM($F$13 ... $G538,1,$Bx16 ... $By17) |
|  | 28 | @DSUM($F$13 ... $G538,1,$Bx18 ... $By19) |
|  | 29 | @DSUM($F$13 ... $G538,1,$Bx20 ... $By21) |
|  | 30 | @DSUM($F$13 ... $G538,1,$Bx22 ... $By23) |
|  | 31 | @DSUM($F$13 ... $G538,1,$Bx24 ... $By25) |
|  | 32 | @DSUM($F$13 ... $G538,1,$Bx26 ... $By27) |
|  | 33 | @DSUM($F$13 ... $G538,1,$Bx28 ... $By29) |
|  | 34 | @DSUM($F$13 ... $G538,1,$Bx30 ... $By31) |
|  | 35 | @DSUM($F$13 ... $G538,1,$Bx32 ... $By33) |
|  | 36 | @DSUM($F$13 ... $G538,1,$Bx34 ... $By35) |
|  | 37 | @DSUM($F$13 ... $G538,1,$Bx36 ... $By37) |
|  | 51 | @SUM(BW5 ... BW49) |
|  | 52 | +M14 |
|  | 53 | @SUM(CA5 ... CA49) |
|  | 54 | +BW51+BW50+CA50 |
|  | 61 | @SUM(CL5 ... CL49)+@SUM(CJ5 ... CJ49) |
|  | 62 | @SUM(CP5 ... CP49)+@SUM(CN5 ... CN49) |
|  | 100 | +CA58+CA59+CA60+CA61 |
|  | 101 | +H538 |
|  | 102 | +I538 |
|  | 103 | +J538 |
|  | 104 | +K538 |
|  | 105 | +BW63−CA87+CA65−BW5 |
|  | 106 | +BW64−CA88+CA66+BW7 |
|  | 107 | +BR88+CJ65 |
|  | 108 | +BC88+CJ66 |
|  | 109 | +AX88 |
|  | 110 | −CA50 |
|  | 111 | +BW71 |
|  | 112 | −BW13 |
|  | 113 | +BW73+BW9 |
|  | 114 | +BW74−BW11 |
|  | 115 | +BW75+BW21 |
|  | 116 | +BW76+CA87−BW17 |
|  | 117 | +BW77+CA88+BW19 |
|  | 118 | +BW78 |
|  | 119 | +BW79−BW23 |
|  | 120 | +BW80−BW25 |
|  | 121 | +BW81+BW15 |
|  | 122 | none (unnecessary) |
|  | 123 | +CP50 |
|  | 124 | +CL50 |

BU4 to BU39, and BX4 to BX49 have inputs that hold pivotally functional positions therein, but they cannot be seen due to limitations of screen structure (due to undisplay processing). Yet, they can be seen by moving the cells to those of BU and BX columns.

Sixth Screen

Input Position (Cell)

Each functional formula or operational expression is entered and set in a position (cell) that the functional formula or operational expression has been written therein.

Meaning

Example: CZ47

Copy a numeral in CZ47 and display it in the position.

Example: CZ12−CX13

Subtract CZ13 from CZ12 and display the result in the position.

Example: @SUM(DD22 ... DD48)

Sum up DD22 to DD48 and display the result in the position.

Seventh Screen

All operations conform to those of the sixth screen.

Eighth Screen

All operations conform to those of the sixth screen.

As described above, the functional formulas and/or operational expressions associate the input setting cells with the output displaying cells of each screen. At the instant of entering a numeral of each transaction in an input setting cell on a predetermined screen, the numeral is displayed in a corresponding output displaying cell on a screen with the associated output displaying cell. That is, the closing sheets and the other sheets are changed and displayed for each entry.

The following illustrates, by use of a set of sample numerals, operating instructions to display the result (settlement) at the instant of an entry.

According to a preferred embodiment of the present invention, daily transactions are entered in three input setting cells marked with "★" on each screen, initial items are in three with "◯" and end-term items are in one with "●". When all the input cells are filled with input items, or at predetermined periods (one or two months), combining processing or merging, described later, is executed accordingly.

Initial Input (Case 1)

<Input Location> Fifth Screen

<Input Method>

Enter numerals of the last end-term balance sheet all with positive integers.

Explanatory Legends

1. Enter an entry in a frame except those with "automatic display" or "preset entry" noted in <Remark>.
2. Don't enter anything in positions other than those specified here. Such positions are protected to make any entry disable, but part of the positions may not be protected. Don't enter anything in the part, or the function will be lost. Don't cancel the protection.
3. The entry has started on Jan. 1, 1999.
4. Although positive integers are supposed to be entered in all frames but ones noted in <Remark>, payments in the contents of financial management are exceptionally given "minus (−)."

| | | Last End-term |
|---|---|---|
| Bank | ◉ | 1,000,000 |
| Post office | ◉ | 5,000,000 |
| Cash | ◉ | 30,000,000 |
| Checking Account | ◉ | 20,000,000 |
| Receivable Account | ◉ | 50,000,000 |
| Payable | ◉ | 20,000,000 |
| Sales | | |
| Purchase | | |
| Inventory | ◉ | 40,000,000 |
| Expense | | |
| Capital | ◉ | 148,000,000 |
| Owner's Credit | | |
| Debt | ◉ | 15,000,000 |
| Loan | ◉ | 13,000,000 |
| Advance | ◉ | |
| Bill Receivable | ◉ | |
| Bill Payable | ◉ | |
| Capital Asset | ◉ | 24,000,000 |
| Capital subscription | ◉ | |
| Investment | ◉ | |
| Deposit Money | ◉ | |
| Allowance | ◉ | |
| Bill Receivable accepted | | |
| Bill Payable Issued | | |

Initial Input (Case 2)

<Input Location> First Screen

<Input Method>

Make an entry in each column as follows.

| Yr | Mo | Da | Summary | * | Bank | Post Office | Cash | Checking | Balance |
|----|----|----|---------|---|------|-------------|------|----------|---------|
| 11 | 1 | 1 | carryover | | 1,000,000 | 5,000,000 | 30,000,000 | 20,000,000 | 56,000,000 |
| | | | | 1 | * | | | | |
| | | | | | * | | | | |

The column at the right of "Checking" is to be used at the time of merging, so don't use it.
Mark (*) and the following numeral are inflexibly set in the protection processing.

Initial Input (Case 3)

<Input Location> Third Screen

<Input Method>

Make an entry in each column as follows.

| Carryover | | | Inventory on Book | | |
|-----------|--------|--------------|---|-----|--------|
| Quantity | Amount | Product Name | ● | @ | Amount |
| ... | 0 | Consumption Tax | 0 | ... | ... |
| 20,000 | 10,000,000 | Note Book | 1 | 500 | 11,000,000 |
| 20,000 | 4,000,000 | Ruler | 2 | 200 | 4,800,000 |
| 75,000 | 6,000,000 | Ball-point Pen | 3 | 80 | 2,000,000 |
| 50,000 | 20,000,000 | Paper Holder | 4 | 400 | 8,000,000 |

Mark ● and following numerals have been protected and inflexibly set beforehand.
Enter "Product Name" and "@" before starting entry.

Daily Input (Case 1)

<Input Location> First Screen (Page 2)

<Input Method>

Make an entry in each column as follows.

| Yr | Mo | Da | Summary | * | Bank | Post Office | Cash | Checking | Balance |
|----|----|----|---------|---|------|-------------|------|----------|---------|
| | | | From previous page | | 1,000,000 | 5,000,000 | 30,000,000 | 20,000,000 | 56,000,000 |
| 11 | 1 | 4 | | 1 | * | 5,000,000 | | | | 61,000,000 |
| | | 5 | | 2 | * | | | -2,000,000 | | 59,000,000 |
| | | 6 | | 3 | * | | | | 1,500,000 | 60,500,000 |
| | | 7 | | 4 | * | | | -1,300,000 | | 59,200,000 |
| | | 8 | | 31 | * | | | -150,000 | | 59,050,000 |
| | | 9 | | 32 | * | | | -200,000 | | 58,850,000 |

* Start initial input from First Screen (Page 1) and daily input from First Screen (Page 2).
* Enter account-title-specific code numbers below the mark (*). "From previous page" and "Balance" are automatically displayed.

Daily Input (Case 2)

<Input Location> Second Screen

<Input Method>

Make an entry in each column as follows

| Purchase | | | | | |
|----|----|----|----|----------|--------|
| Mo | Da | ● | ● | Quantity | Amount |
| Carryover | **** | **** | **** | | |
| 1 | 5 | 1 | 2 | 2000 | 1,000,000 |
| | | 0 | 2 | | 50,000 |
| 1 | 7 | 2 | 3 | 4000 | 800,000 |
| | | 0 | 3 | | 40,000 |

| Sales | | | | | |
|----|----|----|----|----------|--------|
| Mo | Da | ● | ● | Quantity | Amount |
| Carryover | **** | **** | **** | | 0 |
| 1 | 10 | 3 | 5 | | 5,000,000 |
| | | 0 | 5 | | 250,000 |
| 1 | 12 | 4 | 7 | | 15,000,000 |
| | | 0 | 7 | | 750,000 |

Customer — Code Table
Product —

Product code number 0 represents consumption tax.
Enter product code number below the mark ● and customer code numbers below the mark ●.

Daily Input (Case 3)

<Input Location> Fifth Screen

<Input Method>

Make entries in certain columns as follows.

| Bill Payable Issued | Bill receivable accepted |
|---|---|
| 3,000,000 | 2,500,000 |

Bills paid and received are handled on the screen of financial management, so don't enter them.

End-Term Input

<Input Location> Fifth Screen

<Input Method>

Make entries in certain columns of the work sheet as follows.

| Entertainment expense | 200,000 | #–200,000 | 0 |
|---|---|---|---|
| Owner's Credit | 0 | # 200,000 | 200,000 |

Make entries only in the columns marked with #. The others are automatically displayed.
This is an example to transfer an entertainment expense (wrong) to an owner's credit (correct).

As described above, numerical values representing transactions are entered on the accounting input screens, predetermined computations are performed according to the functional formulas or operational expressions, and numerical values representing the computation results are displayed in the output displaying cells. FIGS. 9 through 16 show the screens (accounting output screens) that have completed respective accounting operations thereon.

The following describes the process to increase the number of entries. When there is no entry space in the input setting cells, the number of entries can be increased by combining or merging" (&) new file data and the file data that have been already entered. "Merging" is a term used in operating spreadsheet software; it is to make a copy between different floppy disks. The merged results may be different depending on user's choice among selection criteria: "copy", add", "all" and "Partial". Since the new file data cannot take over the double-entry bookkeeping method by means of merging" alone, specific measures to combine or merge data must be taken.

The following illustrates a case where f1 (for January) is transferred and merged into f2 (for February) after completion of f1 (note that the merging means processing to making a copy between files or floppy disks).

(1) Preparation

Call the original file of the system and enter therein numerals of the last end-term balance sheet (operations previously mentioned with "○"). The file is created as f1, and then the same kind of files f2 to f12 are created (for a year). The file names may be attached arbitrarily, such as fi, f2, f3, ... or 1, 2, 3, ..., but be sure to make differences among them by changing more than one character.

After completion of input of f1, be sure to "save" and "print out" f1 (note that "save" means storing data in a file).

(2) Basic Operations of Merging (for Lotus 1-2-3)

Call and spread f2, then remove f2 to enter fi.

Input procedure (how to press input keys)

The procedure proceeds in the following order: "F1", "F file", "merge", "add", "*", "partial", "*", "range", "★", title (fi in this case)", "*", "put cursor on top cell (head of the range)", "*", "remove f1", and "enter f2 and save". The merging of f1 into f2, that is, a copy of f1 into f2 is thus completed to create f2 identical to f1. F2 thus created hands down the final state from f1 (wherein "*" represents the execution key).

Keep the file of f1, its printout and original record as important papers.

The above are the basic operations, and are put into practice through the next process (3) (wherein the double-entry bookkeeping method is twisted and the number of entries is increased).

(3) The following tables 1 and 2 illustrate operating [instructions regarding the "merging and other operations" for the purpose of increasing the number of entries.

TABLE 1

| | operation | Instruction | Cell Position | Range | Remark |
|---|---|---|---|---|---|
| (1) | Merging | Add | CI5 | 11 | Merge f1 into f2 |
| (2) | | | L15 | 12 | |
| (3) | | | L34 | 13 | |
| (4) | Input | Enter the same amount with an opposite + or – symbol below the amount in the row of "From previous page" on a page (page 2) following the page last to input in FIG. 1, i.e., counterbalance the amount. Further, in the row a line down, enter the amounts of bank, post office, cash and checking accounts in the current end-term of the data room on the fifth screen by referring to the "printout of f1." | | |
| (5) | deletion | | | 15 | Delete part of data |
| (6) | Merging | Add | AM6 | 16 | Merge f1 into f2 |
| (7) | | | AN6 | 17 | |
| (8) | Input | Enter a numeral of "CA65" in "CJ65" and a numeral of "CA66" in "CJ66" by referring to the "printout of f1." | | | |
| (9) | Merging | Copy | W5 | 18 | Delete part of data beforehand (range 18) |
| | The merging is completed, so remove f1, enter f2 and save the screens in f2. | | | | |

TABLE 2

Detailed description of the above operations
(wherein "Code" denotes code numbers within the range)

| | Code | Range Specification | Purpose of Operation |
|---|---|---|---|
| (1) | 11 | C15-CP50 | Transferring the bill column of FIG. 5 from f1 to f2 |
| (2) | 12 | BW5-BW23 | Transferring the debit and credit column of FIG. 5 from f1 to f2 |
| (3) | 13 | CA5-CA37 | Transferring expense column of FIG. 5 from f1 to f2 |
| (4) | | | See the above description in Table 1 (regarding the financial affairs) |
| (5) | 15 | AM6-AM87 | Deleting the quantity and amount of each product brought forward |
| (6) | 16 | AU6-AU87 | Transferring the quantity of each stock product of f1 to the quantity of each corresponding product brought forward in FIG. 3 of f2 |
| (7) | 17 | AX6-AX87 | Transferring the amount of each stock product of f1 to the amount of each corresponding product brought forward in FIG. 3 of f2 |
| (8) | | | See the above description in Table 1 (regarding the purchase and sales affairs) |
| (9) | 18 | W5-AB448 | Updating the code table |

[Since f2 has handed down the final state from f1, the final result of f2 must be identical to that of f1. If they do not match, the most likely cause is an error or errors in entering data, so start over again.

As described above, according to the method of the preset invention, the number of entries can be vastly increased by repeatedly handing down the final result and its data to a new floppy disk (file).

The following describes supplementary information about symbols "○", "●", "★", "&", "*", "☻" and "☺" used in the above explanation and illustrative screens.

(1) Symbols different in input period

Mark ○: Initial. It is generally January 1 or April 1, but it may be any day within the fiscal period. Enter numerals of the last end-term balance sheet in columns with this mark.

Mark ●: End-term. The date depends on the initial. This is a work sheet for adjustment.

Mark ★: Daily. Make an entry in a place (not two places) for each transaction. The entry may be entered one by one based on a handy diary or memo (original record) each time a transaction occurs, every day or collectively (be sure to keep the original record).

Mark &: As an occasion arises, for example, when there is no space to input, or at any periods, such as once a week or month, the accounting operations may be divided regardless of whether blank spaces are left or not. The number of entries can be vastly increased by merging and copying the floppy (file) currently in use into a new floppy (file) according to the double-entry bookkeeping method.

(2) Marks *, and each represent the title of code numbers.

(3) Other numerical symbols regarding the range of screen spreading and printing.

For example, a range of "AM1-AX88" is set to "3", and this makes it possible to open the screen of FIG. 3 instantaneously in response to input of "F5*3 ○ execution" at the time of screen spreading. For printing, "3" has only to be set as the range of printing (F5 is a function key).

(4) For example, assuming that one file (floppy) is assigned by month, symbols may be used as follows: f1 for January, f2 for February, f3 for March, . . . , f12 for December.

When the present invention is implemented such as above, the following benefits can be realized.

(1) Since the statement of accounts and the other documents are completed at the instant of a transaction entry, the accounting operations can be not only indicate the past records, but also be a familiar, essential tool as a "compass for business management" indicating current circumstances and giving a perspective on future business.

(2) Lots of time, cost, labor and/or personnel cost spent doing bookkeeping can immediately be recovered. In addition, "security" and "thorough bookkeeping measures" are ensured immediately.

(3) Further, since individuals and presidents or persons in charge of companies or organizations can easily grasp a perspective on their businesses, they can decide future courses of action, hammer out a business policy and take proper measures, resulting in an incalculable improvement in performance.

(4) If accountants can make use of their time to be active in the product planning and sales department, the companies can really make the most of human resources.

(5) Students, beginners or housewives can learn the principle and spirit of double entry bookkeeping easily with interest as though they were operating a calculator or the like because of its simple, easy operations. It can be an ideal "bookkeeping course" and "introduction to computers" for those interested in computers to begin using computers.

(6) It is also essential for certified public accountants to speed up their services.

(7) Furthermore, the present invention can institute revolutionary changes in the conventional, troublesome accounting and bookkeeping operations under the synergistic effect of "instant completion of closing accounts," an "increase in the number of entries" and "simple, easy operations." The "enjoyable accounting" system contributes toward economic expansion and savings in labor and time that provide and improve a sense of fulfillment in life.

(8) Although conventional computing methods for accounting limit data input and output to some ten figures of numerical values at the most, the method according to the present invention can input more than twenty figures.

What is claimed is:

1. A computer method for accounting, comprising the steps of:
   (a) installing and storing on a computer system spreadsheet software for creating and displaying a plurality of accounting screens each of which is a matrix of cells including input cells and output cells;
   (b) storing on the computer system functional formulas and/or operational expressions for use in determining, based on a first set of numerical values entered in the input cells, a second set of numerical values to be displayed in the output cells;
   (c) creating with said spreadsheet software said plurality of accounting screens, wherein the created accounting screens are of different kinds;
   (d) calling up said plurality of accounting screens to spread and arrange said plurality of accounting screens for display on the computer system;
   (e) for each one of a plurality of financial transactions, entering into the computer system, when processing said one transaction, an input numerical value in a predetermined input cell of said displayed accounting screens, the input cells being arranged in a matrix form having account title code rows and account title columns, an account title code number being entered in a relevant account title code row and an amount of said input numerical value being entered only once for each transaction, in a single one of said input cells at an intersection of an account title row and an account title column corresponding to the account title code number;

(f) using the computer system for performing computations, based on the input numerical values and according to the functional formulas and/or operational expressions, to determine display numerical values indicative of computation results for display in predetermined output cells of said displayed accounting screens so as to complete each of the accounting screens;

(g) creating on the computer system a first file in which all the accounting screens completed in steps (a) through (f) are stored;

(h) storing and printing out, using the computer system, the first file created in step (g); and (i) creating on the computer system a second file in addition to said first file.

2. A computer method for accounting as set forth in claim 1, wherein the plurality of different kinds of accounting screens is at least eight in number.

3. A computer method for accounting as set forth in claim 1, wherein said accounting screens include a screen for entering occurrence of a flow of money.

4. A computer method for accounting as set forth in claim 1, wherein said accounting screens include a screen for entering occurrence of a flow of merchandise.

5. A computer method for accounting as set forth in claim 1 wherein said accounting screens include a screen for display of merchandise management.

6. A computer method for accounting as set forth in claim 1, wherein said accounting screens include a screen for display of customer management.

7. A computer method for accounting as set forth in claim 1, wherein said accounting screens include a screen for financial management displaying amounts for debit and credit transactions under a plurality of account headings.

8. A computer method for accounting as set forth in claim 1, wherein said accounting screens include a screen for displaying a closing account or a settlement of accounts.

9. A computer method for accounting as set forth in claim 1, wherein said accounting screens include a screen for displaying a statement of accounts written in a predetermined form.

10. A computer method for accounting as set forth in claim 1, wherein said accounting screens include a screen for display of business ratio analysis.

11. A computer method for accounting as set forth in claim 1, wherein said step (e) is executed for a fiscal period at the beginning of said fiscal period.

12. A computer method for accounting as set forth in claim 1, wherein said step (e) is executed for a fiscal period at the end of said fiscal period.

13. A computer method for accounting as set forth in claim 1, wherein the first file and the second file correspond to different time periods, and the combining or merging of the first file and the second file is performed for increasing in quantity the input cells for data entry.

14. A computer method for accounting as set forth in claim 1, wherein the plurality of different screens are spread and arranged to provide an overview of current financial circumstances simultaneously with entry of each of the plurality of financial transactions.

15. A computer method for accounting as set forth in claim 1, wherein the input cells are marked with distinctive symbols to facilitate accurate and expeditious data entry, the respective symbols for daily transaction items, initial items and end-term items being different from each other.

16. A computer method for accounting as set forth in claim 1, further comprising the steps of (j) calling up said second file after said step (h) to spread and arrange said second file for display on the computer system;

(k) recalling said first file after step (j) and performing predetermined computations on the computer system for said first file; and (l) combining or merging on the computer system said first file, for which the predetermined computations have been performed in step (k), into said second file spread and arranged in step (j) so that a final state of said first file will be handed down to said second file.

* * * * *